US007971183B2

(12) United States Patent
Grechanik et al.

(10) Patent No.: US 7,971,183 B2
(45) Date of Patent: *Jun. 28, 2011

(54) TOOL FOR CONVERTING LEGACY APPLICATIONS TO WEB SERVICES

(75) Inventors: Mark Grechanik, Chicago, IL (US); Kevin Michael Conroy, Evanston, IL (US); Kishore S. Swaminathan, Willowbrook, IL (US); Edy S. Liongosari, Wheeling, IL (US)

(73) Assignee: Accenture Global Services Limited, Dublin (IE)

( * ) Notice: Subject to any disclaimer, the term of this patent is extended or adjusted under 35 U.S.C. 154(b) by 1161 days.

This patent is subject to a terminal disclaimer.

(21) Appl. No.: 11/710,680

(22) Filed: Feb. 23, 2007

(65) Prior Publication Data

US 2008/0209446 A1   Aug. 28, 2008

(51) Int. Cl.
*G06F 9/44* (2006.01)
*G06F 15/177* (2006.01)
(52) U.S. Cl. .................... 717/107; 717/110; 709/220
(58) Field of Classification Search .................. 717/107, 717/110
See application file for complete search history.

(56) References Cited

U.S. PATENT DOCUMENTS

| 7,590,988 | B2 * | 9/2009 | Milligan et al. | 719/328 |
| 7,593,994 | B2 * | 9/2009 | Milligan et al. | 709/206 |
| 2004/0024787 | A1 * | 2/2004 | Edwards et al. | 707/200 |
| 2004/0260820 | A1 * | 12/2004 | Bearman | 709/229 |
| 2005/0257196 | A1 * | 11/2005 | Hollander et al. | 717/115 |
| 2006/0206599 | A1 * | 9/2006 | Milligan et al. | 709/223 |

OTHER PUBLICATIONS

Sneed et al., "Creating Web Services from Legacy Host Programs"; IEEE, 2003, 7pg.*

Soha et al., "The Horizon of the Grid for E-Government"; eGovernment Workshop, 2005, 18pg.*

Eli Tilevich et al., "*Appletizing: Running Legacy Java Code Remotely From a Web Browser*", College of Computing, Georgia Institute of Technology, tilevich,yannis@cc.gatech.edu, Marcus Handte, University of Stuttgart, (mhandte@web.de), (10 pages).

Bryan Buck et al., "*An API for Runtime Code Patching*", Computer Science Department, University of Maryland, College Park, MD 20742 USA, (buck@cs.umd.ed), (12 pages).

Eric Wohlstadter, et al., "*Generating Wrappers for Command Line Programs, The Cal-Aggie Wrap-O-Matic Project*", Department of Computer Science, University of California, Davis CA, (wohlstad/Jacksoni/devanbu@cs.ucdavis.edu) (10 pages).

José M. Troya et al., "*Controllers: Reusable Wrappers to Adapt Software Components*", Dpto. De Lenguajes y Ciencias de la Computación, Universidad de Málaga, Campus de Teatinos, Málaga, Spain, (28 pages).

Robert C. Miller, "*End User Programming for Web Users*", MIT Lab for Computer Science, Cambridge, MA, (http://graphics.lcs.mit.edu/ ~rcm) (4 pages).

(Continued)

*Primary Examiner* — Philip Wang
*Assistant Examiner* — Ryan D Coyer
(74) *Attorney, Agent, or Firm* — Fish & Richardson P.C.

(57) ABSTRACT

A design tool assists with the conversion of legacy applications to web services. The design tool provides a flexible and visual design environment through which web services are defined, created, and deployed for controlling a legacy application. As a result, the legacy applications may be made accessible through web services to remote callers consonant with the wide spread adoption of web services. An organization may thereby extend the life-cycle of their legacy applications and continue to realize the benefit of substantial investment in the applications.

21 Claims, 17 Drawing Sheets

OTHER PUBLICATIONS

Mark Grechanik, et al., "*Integrating and Reusing GUI Binary Legacy Applications*", UT Center for Advanced Research In Software Engineering (UT ARISE), University of Texas at Austin, Austin, Texas, (grechani@ece.utexas.edu), (13 pages).

Robert C. Miller et al., "*Integrating a Command Shell Into a Web Browser*", Carnegie Mellon University, rcm@ecs.cmu.edu (16 pages).

James R. Larus et al., "*EEL: Machine-Independent Executable Editing*", Computer Sciences Department, University of Wisconsin-Madison, Madison, WI, (larus@cs.wisc.edu), (12 pages).

M. Li, et al., and D.W. Walker, "*A Wrapper Generator for Wrapping High Performance Legacy Code as Java/CORBA Components*", Computer Science and Mathematics Division, Oak Ridge, TN, (walker@msr.edu.epm.ornl.gov), (12 pages).

Mattis Neiling et al., "*WrapIt:Automated Integration of Web Databases with Extensional Overlaps*", Free University of Berlin, Department of Economics, Institute for Information Systems, Berlin, Germany, (mneiling@wiwiss.fu-berlin.de), (16 pages).

Brad A. Myers, "*User Interface Software Technology*", Human Computer Interaction Institute, Carnegie Mellon University, ACM Computing Surveys, vol. 28, No. 1, Mar. 1996, (bam@cs.cmu.edu), (3 pages).

Aske Simon et al., "*Extending Java for High-Level Web Service Construction*", University of Aarhus, ACM Transactions on Programming Language and Systems, vol. 25, No. 6, Nov. 2003, pp. 814-875.

Constantinos Phanouriou et al., "*Transforming Command-Line Driven Systems to Web Applications*", Department of Computer Science, Virginia Tech, Blacksburg, VA, (phanouri@cs.vt.edu), (4 pages).

C. Ferris and J. Farrell, "*What are Web Services*", Communications of the ACM, vol. 46, No. 6, p. 31.

Rob Sinclair, Accessibility Technical Article, "*Microsoft Active Accessibility: Architecture*", May 2000, pp. 1-7.

* cited by examiner

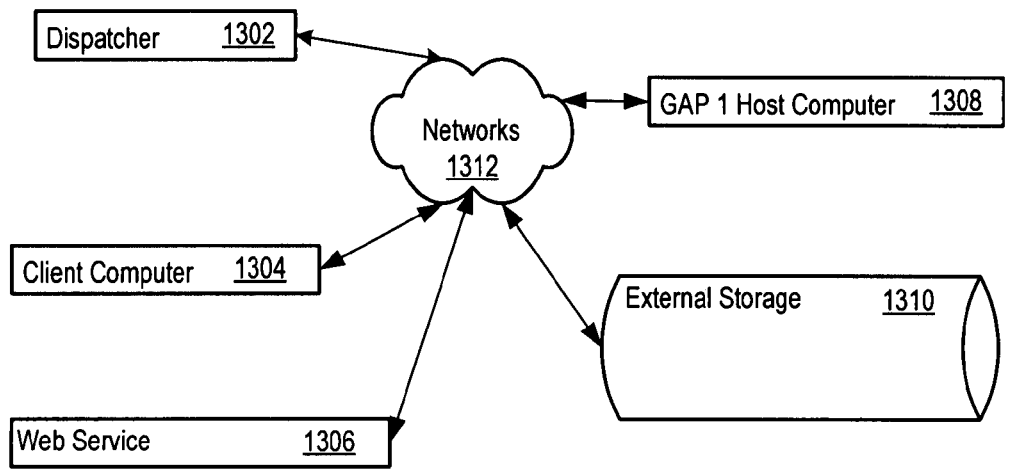
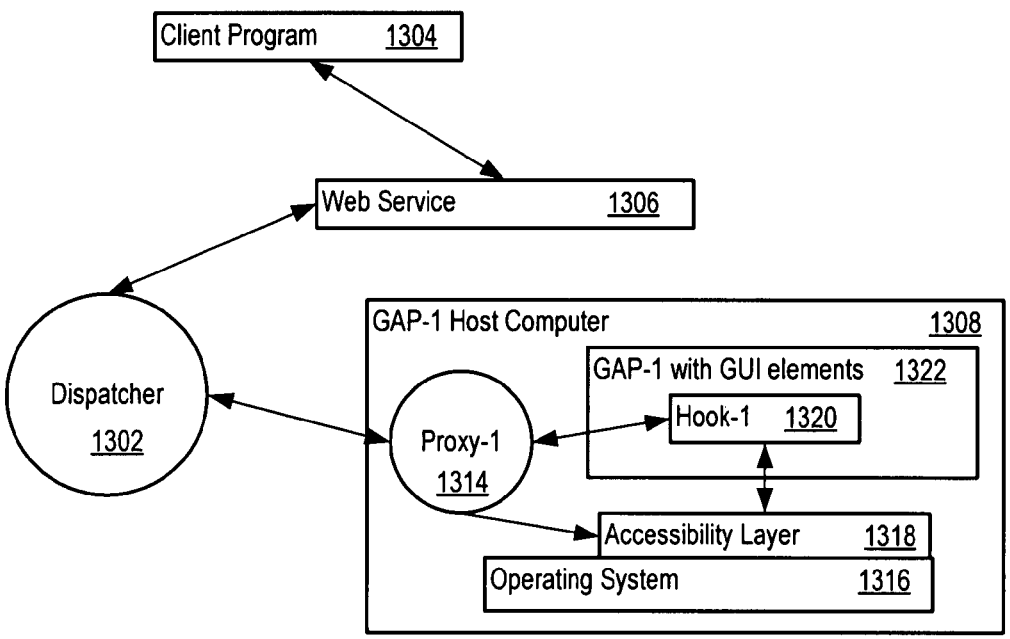
Figure 13

Structural Representation of a GUI of a GAP and UI Elements of the GAP    1402

| |
|---|
| GAP-1 UI Element-1 Label     1404 |
| GAP-1 UI Element-1 Identifier     1406 |
| GAP-1 UI Element-1 Location     1408 |
| GAP-1 UI Element-2 Location     1410 |
| GAP-1 UI Element-3 Location     1412 |

GAP GUI Screen Sequence Representation    1414

| |
|---|
| GAP-1 GUI Screen Sequence -1     1416 |
| GAP-1 GUI Screen Sequence -2     1418 |
| GAP-1 GUI Screen Sequence -3     1420 |
| GAP-1 GUI Screen Sequence -4     1422 |
| GAP-2 GUI Screen Sequence -1     1424 |
| GAP-2 GUI Screen Sequence -2     1426 |
| GAP-2 GUI Screen Sequence -3     1428 |
| GAP-2 GUI Screen Sequence -4     1430 |

GAP-1 GUI Element-1 Encoded Location     1432
Information

Figure 14

TOOL FOR CONVERTING LEGACY APPLICATIONS TO WEB SERVICES

BACKGROUND OF THE INVENTION

1. Technical Field

This disclosure concerns systems and methods for building graphical user interface application (GAP) based integrated systems. In particular, this disclosure relates to an efficient and non-invasive approach to creating integrated systems from GAPs and web services.

2. Background Information

There is a strong demand for modern systems to integrate (e.g., exchange information) with other systems. However, modern systems often incorporate Graphical User Interface (GUI) Applications (GAPs) implemented in a closed and monolithic manner. System integrators find retrofitting existing GAPs to interoperate a particularly difficult technical challenge, especially for closed and monolithic GAPs. Thus, a fundamental technical problem of interoperability for system integrators is how to compose integrated systems with existing GAPs that do not already interoperate with each other and web services, efficiently and non-invasively.

System Integrators and organizations purchasing system integration services recognize the difficulty and enormous expense of building integrated applications. Beyond developing integrated applications components, system integrators and applications programmers must define protocols and implement functionality required to enable information exchanges between the integrated applications' components, which may include GAPs and web services. Organizations tend to use legacy GAPs as long as possible in business operations, primarily to realize the return on investment for the legacy GAPs. However, system integrators find enabling GAPs to interoperate difficult, because system integrators consider the vast majority of GAPs encountered as closed and monolithic. In other words, most GAPs do not expose programming interfaces or data in known formats. Thus, while system integrators find the use of GAPs as components in integrated applications desirable, often the original implementation of a GAP makes enabling interoperability impossible.

In contrast to GAPs, developers design web services as software components that flexibly exchange information over networks, including the Internet. Consequently, business industry demand for applications that easily and inexpensively exchange information has partly caused widespread acceptance of web services. Employing web services, unlike GAPs, enables organizations to quickly build integrated systems by composing (i.e., configuring) the web services for information exchange. Organizations have invested heavily in legacy GAPs, but GAPs are not easily added to an existing framework of web services. System integrators find it difficult to modify source code of GAPs to enable interoperability, because of brittle legacy architectures, poor documentation, significant programming effort, and subsequently, the large cost of such projects. Organizations often do not have access to the source code necessary to modify third-party GAPs. Given the complexity of GAPs and the cost to make GAPs interoperable, a fundamental problem exists of how to enable GAPs to exchange information with each other and web services, and build integrated systems using the GAPs and web services, efficiently and non-invasively.

Organizations consider e-procurement systems (EPS) critical, because EPS influence all areas of the organization performance. Businesses employ elaborate EPS that often include different GAPs that support different steps of a purchasing process. In EPS, the rule of separation of duty requires operations separated into subparts and performed by independent persons (i.e., agents) to maintain integrity. The separation of duty rule prevents a person from causing a problem that will go unnoticed, because a person who creates or certifies a transaction may not also execute the transaction. Implementing the separation of duty rule results in agents requiring different GAPs that provide different services for different parts of a purchasing process.

Consider a typical e-procurement scenario, where employees order items using an electronic shopping cart service of a web-based application BuyMoreStuff (BMS). Department managers review selected items in the shopping cart, approve and order the items, and enter the ordered items into Acme Expense GAP (AEG), which is a third-party closed and monolithic Windows GAP that the company uses internally to keep track of purchases. The BMS web service sends a notification to a company accountant, who uses a closed and monolithic GAP named My Invoices and Estimates (MIE) to create invoices for ordered goods. When a receiving agent receives the ordered goods from BMS, a receiving agent compares them with the entries in AEG. The accountant can view the AEG records, but cannot modify the AEG records, and likewise, only the accountant can insert and modify data in MIE. If the received goods match the AEG records, then the receiving agent marks the entries for the received goods in AEG and notifies the accountant. After comparing the invoices in MIE with the marked entries in AEG and determining that they match, the accountant authorizes payments. In this example, each procurement agent uses a different GAP to accomplish different portion of a business process. Conceivably, several GAPs used together accomplish a single business goal, and agents transfer data between GAPs and perform other operations manually. Organizations clearly recognize automation as critical to improving the quality and efficiency of business services.

A need has long existed for a system and method to enable GAPs to interoperate with each other and with web services.

SUMMARY

Composing legacy GAPs with each other and web services into integrated systems allow organizations to improve their business processes, and extend the usability of legacy GAP systems. The Composer of Integrated Systems (Coins) provides an approach for creating integrated systems composing GAPs and web services. Coins combines a non-standard use of accessibility technologies used to access and control GAPs in a uniform way with a visualization mechanism that enable nonprogrammers to compose GAPs with each other and web services. Coins uses accessibility technologies to control GAPs and their user interface (UI) elements as programming objects, set and retrieve UI elements, and associates methods with actions that users perform on the UI elements. For example, when a user selects a combo box item the combo box invokes a method that performs some computation. A web service would invoke methods, and set or retrieve field values of a programming object representing the combo box—to control the combo box programmatically. Coins controls GAPs as programming objects, and UI elements as fields of the programming objects, and invokes methods on the objects to perform actions and manipulate the GAPs and UI elements. Unfortunately, web services cannot access and manipulate UI elements as pure programming objects, because UI elements only support user-level interactions. However, accessibility technologies expose a special interface that allows the Coins to invoke methods, and set and retrieve UI element values, and thereby control UI elements and GAPs.

Accessibility technologies provide different aids to disabled computer users, including, as examples: screen readers for the visually impaired; visual indicators or captions for users with hearing loss; and software to compensate for motion disabilities. Under 36 CFR part 1194, the Architectural and Transportation Barriers Compliance Board's Electronic and Information accessibility Standards requires that when Federal agencies develop, procure, maintain, or use electronic and information technology, the electronic and information technology allows Federal employees with disabilities access and use of information and data comparable to Federal employees without disabilities. Accordingly, because the Federal Government's large appetite for technology, and the desire of the technology industry to sell technology to the Federal Government, most computing platforms include accessibility technologies. For example, Microsoft designed Microsoft's Active accessibility (MSAA) technology to improve the way accessibility aids work with applications running on Windows, and Sun Microsystems accessibility technology assists disabled users who run software on top of Java Virtual Machine (JVM). Many computing platforms, as well as libraries and applications incorporate accessibility technologies in order to expose information about user interface elements. Accessibility technologies provide a wealth of sophisticated services useable to retrieve UI elements attributes, set and retrieve UI element values, and generate and intercept different events. Most implementations of accessibility technologies exploit the fact that UI elements expose a well-known interface (i.e., accessibility interface) that exports methods for accessing and manipulating the properties and the behaviour of UI elements. For example, a Windows UI element employs the IAccessible interface to allow access and control of the UI element using the MSAA API calls. Programmers may write code to access and control UI elements as if the UI elements were standard programming objects. Accessibility API calls may include: get into object; perform action on object; get value from object; set value on object; navigate to object; and set property on object.

Organizations may require legacy GAPs to support new business processes. Coins allows users to extend the functionality of GAPs by integrating them with web services. For example, a new business procedure may require users to submit information about entered or modified expenses to a web service that verifies the expenses using a set of business rules before saving the expenses in QE. Because the business invested in AEG and used AEG for many years, integrating AEG with a new service allows the business to achieve new functionality at a low cost. Coins allows a user to connect UI elements of AEG with properties of the web service to specifying how to transfer data from the AEG GAP to the new service. Coins user selects a method of the web service, and determines how to invoke the web service, for example, a user performing some action on a UI element (e.g., clicking a button on a GAP screen) invokes the method. Coins user defines whether to pass the values of the UI elements as parameters to the invoked method, or use the values to set properties of the web service before invoking the method. In addition, the Coins user specifies how to use the return values of the invoked method, for example, whether to update selected UI elements of the GAPs with the values, or display the values in message dialogs. Coins user may define an action in response to certain return values of the invoked method.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 13 shows a web service creation tool.

FIG. 14 shows a structural representation of a GUI of a GAP and UI elements of the GAP.

DETAILED DESCRIPTION

Figure 1:
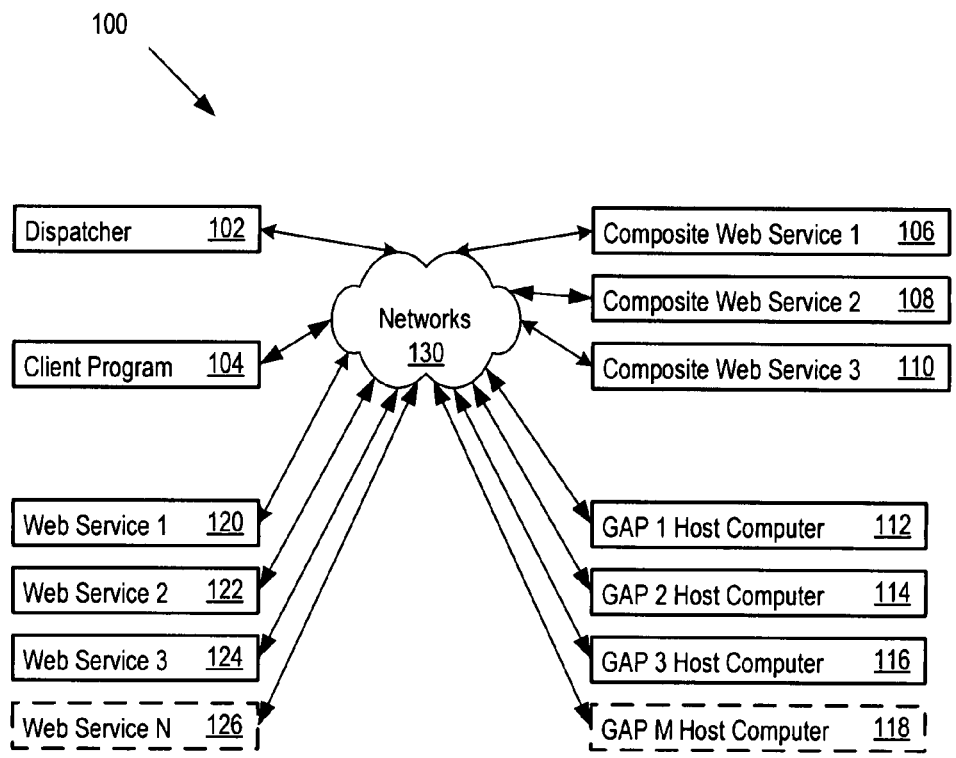
FIG. 1 illustrates an integrated system composing GUI-Based Applications and web services.

The Composer of Integrated Systems (Coins) addresses the technical challenge of enabling GAPS to exchange information (i.e., interoperate) with each other and web services over the Internet, and solves the technical problem of composing integrated systems using GAPS and web services, efficiently and non-invasively. Coins allows users to create composite web services from multiple GAPS and web services. Coins identifies and registers multiple GAPS, as a result of the Coins capturing, through the accessibility layer (i.e., accessibility API), information regarding GAPS and user interface (UI) elements of the GAPS. Coins registers GAPs and web services using a design tool user interface to capture user interface interaction specifications that create user interface element correspondence between a UI element of one GAP and a different UI element in a different GAP. Coins defines a web service parameter relationship between a web service parameter and one or more UI elements of a GAP, and defines a composite web service definition for a composite web service from one or more web service parameters. Coins generates and deploys composite web services based on composite web service definitions, one or more user interface interaction specifications, and one or more web service parameter relationships. Coins may also generate and deploy web services based on web service definitions that include one or more user interface interaction specifications between UI elements of different GAPS, and one or more web service parameter relationships.

Coins uses proxies to command and control GAPs and UI elements of GAPs to fulfil web service requests. When a proxy receives a response from a GAP, the proxy extracts data from the GAP, and forwards the extracted data to one or more web services. Proxies use hooks to perform various actions on UI elements and GAPs programmatically through accessibility API calls. Accessibility technologies allow hooks to register for different events produced by UI elements and GAPs monitored by accessibility APIs. One or more GAPs may run with a proxy and corresponding hooks on a single designated GAP host computer along with a accessibility API.

Coins uses a dispatcher as a central point for coordinating proxies in a distributed environment. A proxy registers with the dispatcher under a unique name, collects GAP identification data and information about GAPs running with the proxy on a GAP host computer, and sends the collected GAP identification and information about GAPs to the dispatcher. The dispatcher uses the information collected from the proxies to route web service requests to proxies. The dispatcher routes web service request components of composite web services to one or more GAP host computers, where corresponding proxies ultimately command and control GAPs and UI elements. The dispatcher acts as an intermediary that enables web services and GAPs to run on separate computers while presenting a common view to client programs. Because organizations may move web services and GAPs around the enterprise computing environment for various reasons (e.g., to improve business processes efficiencies or the performance of applications) the dispatcher provides web services and GAPs migration and location transparency to client programs.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations may be depicted as being stored in memories, all or part of systems and methods consistent with Coins may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the Coins will be described, methods, systems, and articles of manufacture consistent with the system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors, and may be implemented or distributed as shared libraries, application programming interfaces (APIs), or in other forms. Furthermore, the programs, or any portion of the programs, may instead be implemented in hardware.

FIG. 1 illustrates an example of an Integrated System 100 that includes composed GUI-Based Applications and web services. In the example shown in FIG. 1, the Integrated System 100 includes the following components: a dispatcher 102; a client program 104; composite web services 106, 108, and 110; GAP host computers 112, 114, and 116; and web services 120, 122, 124, and 126. The Integrated System 100 components may communicate through a Network 130 such as the Internet. The Integrated System 100 uses the dispatcher 102 to coordinate communication between GAPs, web services, and composite web services. When a client program 104 invokes a web service method managed by a web service 120-126 or composite web service 106-110, the designated web service sends one or more requests to the dispatcher 102, which routes the requests to the appropriate GAP host computers 112, 114, 116 and 118. The GAPs running on their respective GAP host computers 112, 114, 116, and 118 complete the requests and return responses to the dispatcher 102. The dispatcher 102 forwards the responses to the appropriate web services (e.g., web services 120-126 or composite web services 106-110), which send responses to the client program 104. Prior to composing the Integrated System 100 using the GAPs and web services, each business process operation that the client program 104 invoked required agents to interact with the one or more GAPs separately, because of a lack of interoperability between the one or more GAPs.

Figure 2:
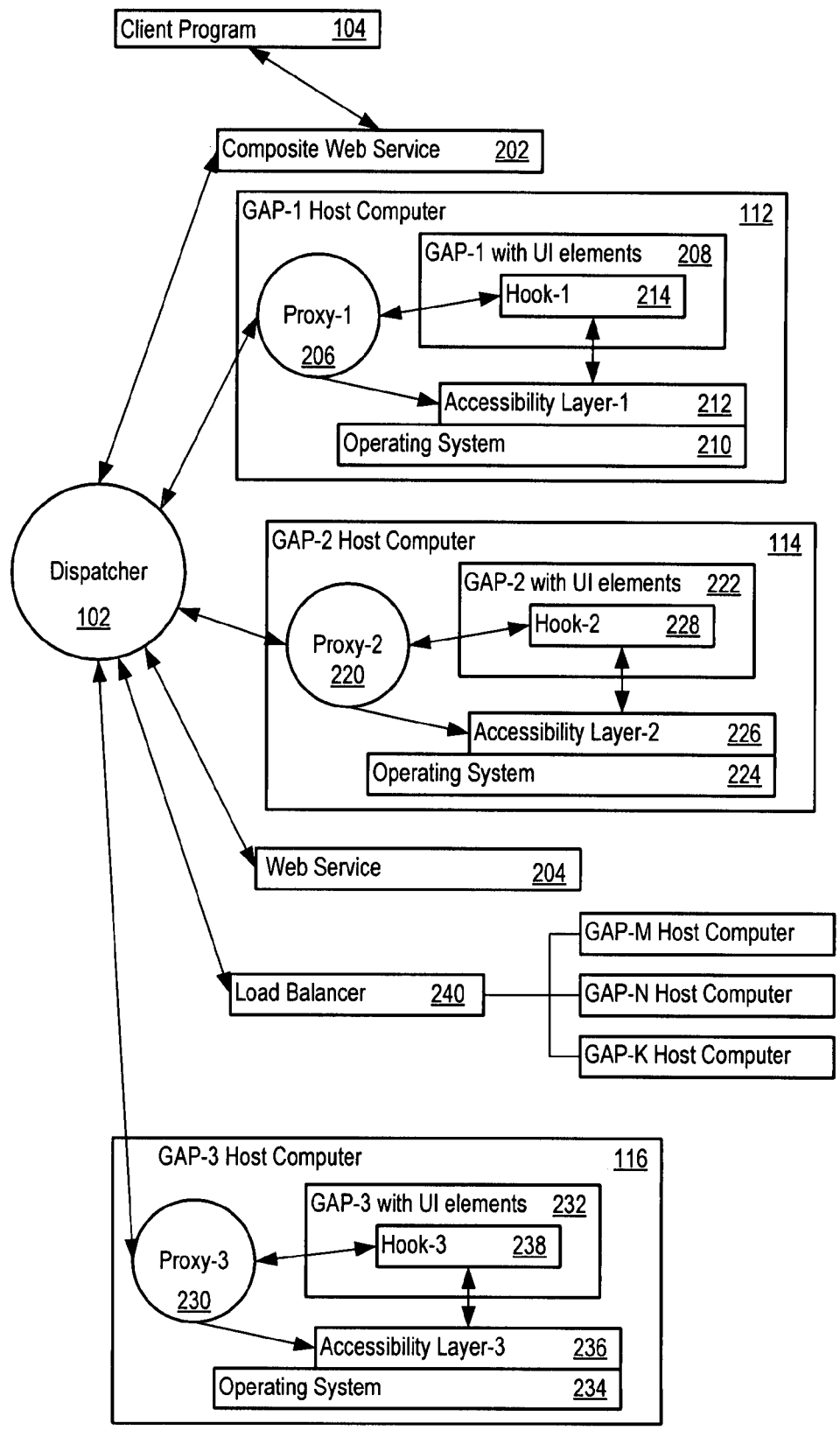
FIG. 2 shows a dispatcher coordinating communication between GAPs and web services.

FIG. 2 shows a dispatcher 102 coordinating communication between GAPs and web services. The dispatcher 102 acts as an intermediary that enables web services and GAPs to run on separate computers while presenting a common view to client programs 104. Because organizations may move web services and GAPs around the enterprise computing environment for various reasons (e.g., to improve business processes efficiencies or the performance of applications) the dispatcher 102 provides web services and GAPs migration and location transparency to client programs 104. In one implementation of Coins, when a client program 104 invokes a web service method corresponding to a composite web service 202, the composite web service 202 sends one or more web service request components to dispatchers, such as the dispatcher 102. A composite web service may include multiple request components (e.g., methods that need to be invoked to implement full control over multiple GAPs). The dispatcher 102 determines to which proxies (e.g., proxy-1 206, proxy-2 220 and proxy-3 230) to route the web service request components, based on information collected from the proxies. A proxy registers with the dispatcher 102 under a unique name, collects GAP identification data and information about the GAPs running on the GAP host computer (e.g., GAP-1 host computer 112, GAP-2 host computer 114, and GAP-3 host computer 116) with the proxy, and sends the GAP identification data and information to the dispatcher 102.

In one implementation, when proxy-1 206 receives a web service request component the proxy-1 206 interacts with one or more UI elements of the GAP-1 with UI elements 208 through the hook-1 214, in response to the web service request component. The accessibility layer-1 212 may support hook-1 214 to perform various actions on GAP-1 with UI elements 208 programmatically. Proxy-2 220 in communication with GAP-2 host computer 114 for GAP-2 with UI elements 222 and hook-2 228 may register the GAP-2 with UI elements 222 with the dispatcher 102, resulting in a second composite web service request component of the composite web service to route through the dispatcher 102 to the GAP-2 host computer 114. In one implementation, when proxy-2 220 receives the second web service request component the proxy-2 220 interacts with one or more of the UI elements of the GAP-2 with UI elements 222 through the hook-2 228, in response to the second web service request component. The accessibility layer-2 226 may support hook-2 228 to perform various actions on GAP-2 with UI elements 222 programmatically. The dispatcher 102 may use a load balancer 240 to route web service requests to multiple GAP host computers.

In one implementation of the Integrated System 100 multiple instances of a GAP (e.g., Acme Expense GAP (AEG)) run concurrently on separate GAP host computers (e.g., GAP-1 host computer 112, GAP-2 host computer 114, and GAP-3 host computer 116). The dispatcher 102 assigns each instance of AEG a unique GAP identifier, enabling the dispatcher 102 to coordinate parallel execution of multiple instances of AEG, so that when the composite web service 202 sends a composite web service request component to the dispatcher 102 in response to a request from a client program 104 the dispatcher 102 routes the composite web service request component to the correct instance of AEG.

Figure 3:
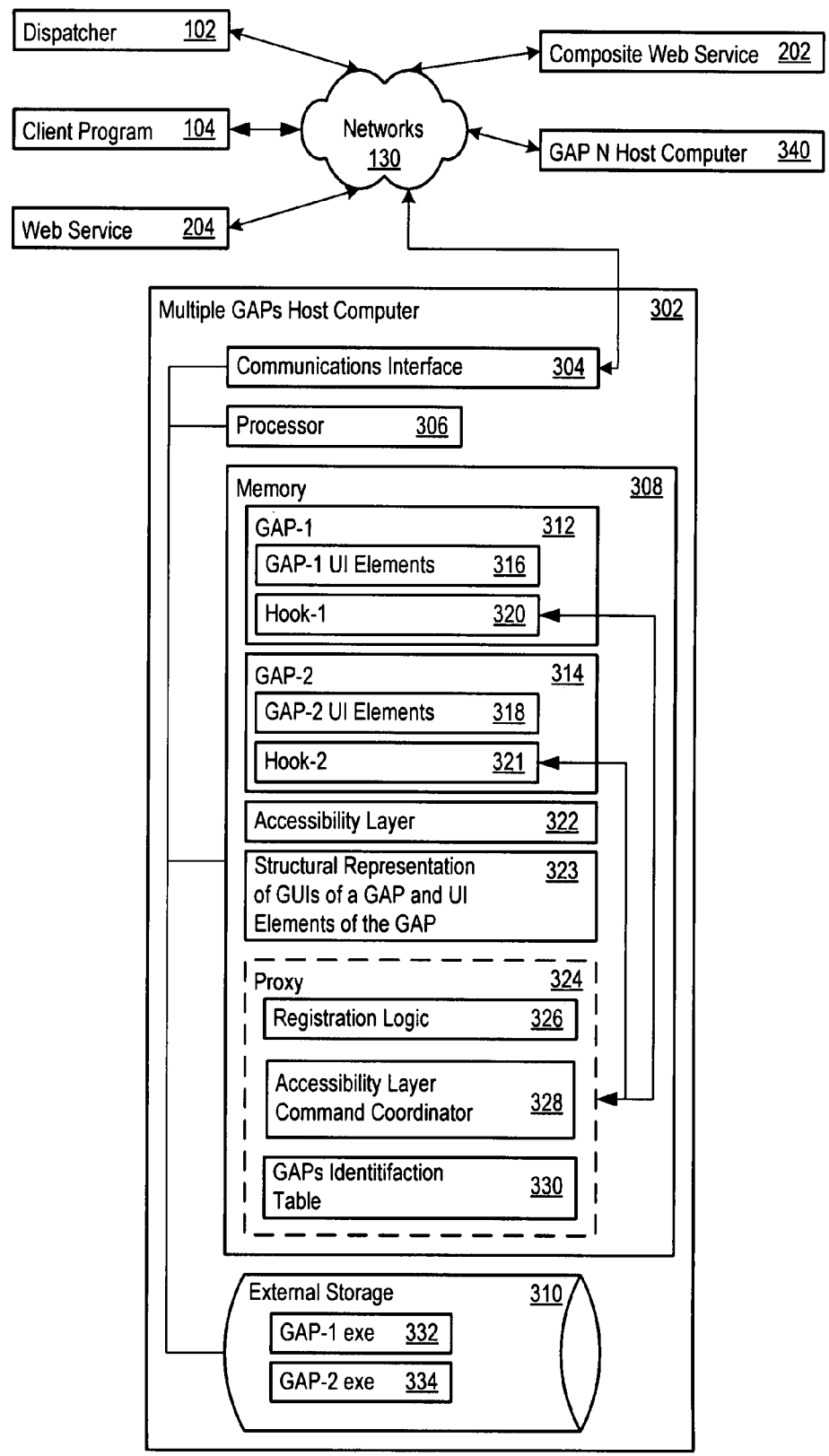
FIG. 3 illustrates a GAP host computer concurrently running two GAPs.

FIG. 3 illustrates a GAP host computer 302 concurrently running two GAPs. In one implementation, a single GAP host computer may run multiple GAPs, and include, in addition to a communications interface 304 to communicate with various components of an Integrated System 100, a processor 306, memory 308, and external storage 310. The memory 308 may include: instances of different GAPs running (e.g., GAP-1 312, and GAP-2 314); GAP-1 UI elements and GAP-2 UI elements corresponding to GAP-1 312 and GAP-2 314, respectively; a hook-1 320 and hook-2 321; accessibility layer 322; a structural representation of GUIs of a GAP and UI element of the GAP 323; and a proxy 324. In one implementation GAP-1 312 may represent an instance of a third-party closed and monolithic Windows GAP (e.g., an Acme Expense GAP (AEG)) that a company uses internally to keep track of purchases, and GAP-2 314 may represent a closed and monolithic GAP named My Invoices and Estimates (MIE) that the company uses to create invoices for ordered goods.

In one implementation, the accessibility layer 322 supports hook-1 320 and hook-2 to perform various actions programmatically on GAP-1 312, GAP-1 UI elements 316, and GAP-2 314 and GAP-2 UI elements 318, respectively. The accessibility layer 322 may also assist with capturing a structural representation of GUIs of a GAP and UI elements of the GAP 323, as a result of interactions with the GAP. The structural representation of GUIs of a GAP and UI elements of the GAP 323 may provide the proxy 324, hook-1 320 and hook-2 321 comprehensive information to locate, control, and manipulate GAP-1 312, GAP-2 314, GAP-1 UI elements 316, and GAP-2 UI elements 318. The structural representation of GUIs of a GAP and UI elements of the GAP 323 may be implemented with a data structure (e.g., an XML file) that captures a depth first traversal of the GUI, breadth first traversal of the GUI, or that otherwise stores the interface elements and screen sequences of the GUI. The proxy 324 may analyze the structural representation of GUIs of a GAP and UI elements of the GAP 323 to locate a GAP UI element in the GAP GUI.

The proxy 324 may include registration logic 326, an accessibility layer command coordinator 328, and a GAPs identification table 330. The proxy 324 may use the registration logic 326 to register GAP-1 312 and GAP-2 314 with the dispatcher. The accessibility layer command coordinator 328 may control GAP-1 312 and GAP-1 UI elements 316 through hook-1 320, in response to a web service request component. To that end, the accessibility layer command coordinator 328 may receive web service request components, extract the graphical user interface element identifiers, a structural representation of a GAP, and the requested action on the identified graphical user interface element. The accessibility layer command coordinator 328 may then traverse the structural representation 323 to determine where the identified graphical user interface element resides in the GAP user interface, and make calls to the hook to navigate the GAP to the interface that includes the identified graphical user interface element. Once at the appropriate interface, the accessibility layer command coordinator 328 may then exercise the graphical user interface element through the hook to perform the requested action.

In another implementation, proxy-1 206 uses an accessibility layer command coordinator running on and dedicated to GAP-1 host computer 112 to control GAP-1 with UI elements 208 through hook-1 214, in response to a web service request component. The proxy 324 may collect GAP identification data and information about GAPs (e.g., GAP-1 312, and GAP-2 314) hosted with proxy 324 on the multiple GAPs host computer 302, and stores the collected GAP identification data and information about the GAPs in the GAPs identification table 330. In one implementation, the proxy 324 may store GAP Identifiers for multiple locally hosted GAPs (e.g., GAP-1 312, and GAP-2 314) in the GAP identification table 330. The proxy 324 may periodically send the collected GAP identification data and information about the GAPs to the dispatcher 102. The multiple GAPs host computer 302 may use the external storage 310 to store the GAP-1 exe 332 and GAP-2 exe 334 programs.

In an alternative implementation, the dispatcher 102 receives a web service request message from the web service 204 that includes a GAP UI element Identifier and an action request identifier for a specific GAP UI element (e.g., GAP-1 UI elements 316). The GAP UI element may correspond to a GAP (e.g., GAP-1 312) executing in memory 308. The dispatcher 102 may send the web service request message to proxy 324, which extracts the GAP UI element identifier and action request identifier from the web service request message. The proxy 324 may perform an action against the GAP-1 UI elements 316 specified in the action request identifier through hook-1 320. The action request identifier may include a GUI element data setting action, or a GUI element data retrieval action that the proxy performs through hook-1 320 against the GAP-1 UI elements 316 specified in the action request identifier.

Figure 4:
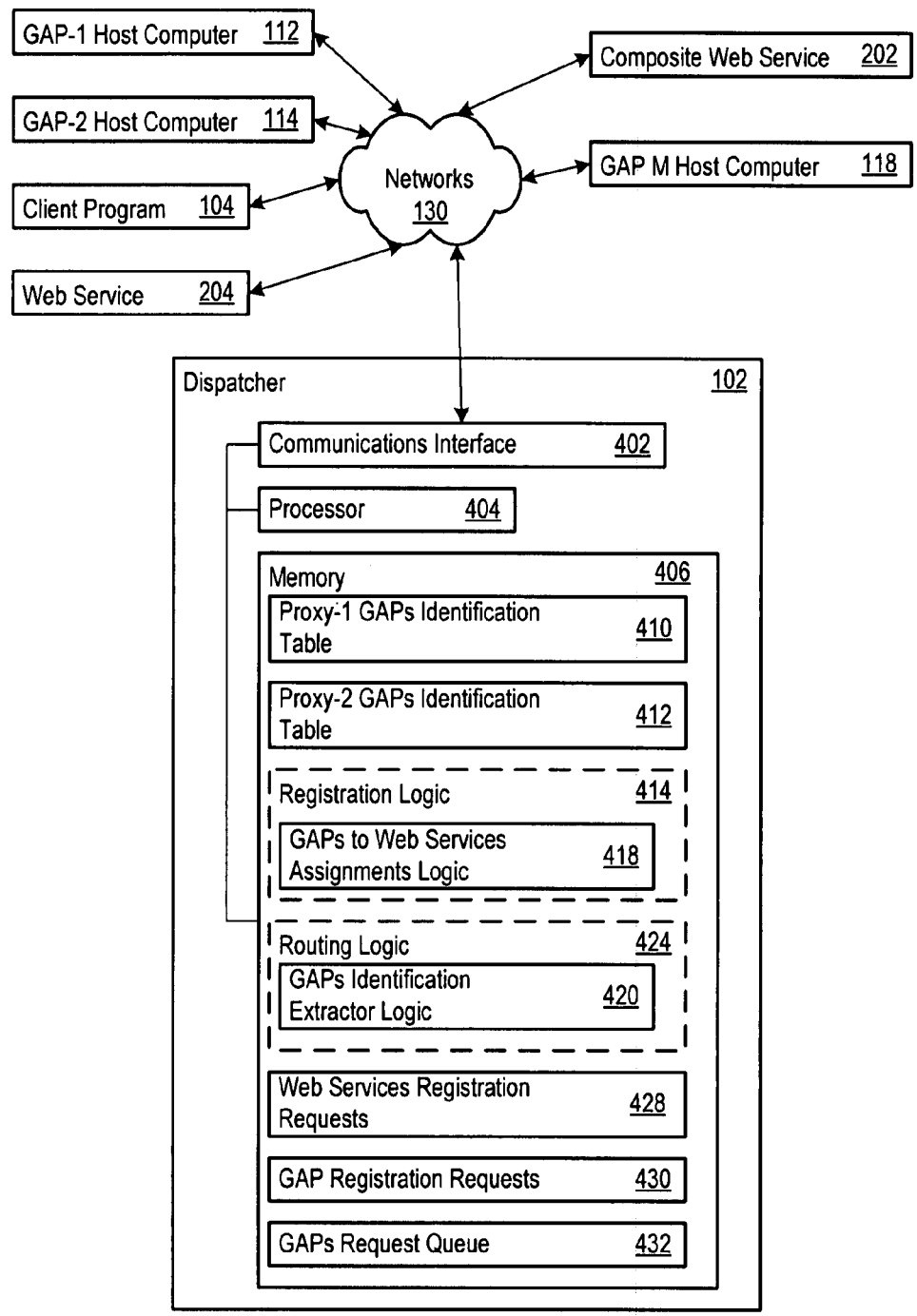
FIG. 4 shows a dispatcher and dispatcher components.

FIG. 4 shows a dispatcher 102 and dispatcher components. The dispatcher 102 may include a communications interface 402, a processor 404, and memory 406. The dispatcher 102 memory 406 may include: a proxy-1 GAPs identification table 410; a proxy-2 GAPs identification table 412; Registration logic 414; Routing logic 424; web services registration requests 428; GAP registration requests 430; and a GAPs request queue 432. Coins uses the dispatcher 102 as a central point for coordinating proxies (e.g., proxy-1 206 and proxy-2 220) in a distributed environment. A proxy (e.g., proxy-1 206 and proxy-2 220) may register with the dispatcher 102 under a unique name, and periodically collect GAP identification data and information about GAPs running with the proxy on the GAP Host computers (e.g., GAP-1 host computer 112, and GAP-2 host computer 114), and send the collected GAP identification data and information about GAPs to the dispatcher 102. The dispatcher 102 may store the collected information from each proxy in separate proxy GAPs identification tables (e.g., proxy-1 GAPs identification table 410, and proxy-2 GAPs identification table 412). The proxy GAPs identification tables may contain GAP identification data and information for multiple GAPs. For example, as shown in FIG. 3, the proxy 324 may periodically send the dispatcher 102 the GAPs identification table 330, which may include GAP identification data and information for GAP-1 312 and GAP-2 314.

In one implementation, when a client program 104 invokes a method of a web service 204 or composite web service 202, the web service 204 or composite web service 202 to which the method belongs sends a web services registration request 428 to the dispatcher 102. The dispatcher 102 may identify the GAPs required to fulfil a method of a web service 204, or a composite web service 202. The dispatcher 102 may use registration logic 414 to receive GAP registration requests 430 from GAPs and web services registration requests 428 from web services 204, and composite web services 202. The dispatcher 102 may also use the registration logic 414 to control GAPs to web services assignments logic 418 to analyze the proxy GAPs identification tables to assign GAPs and UI elements to methods of web services 204, and methods of composite web services 202. In one implementation, the registration logic 414 instantiates the proxy GAPs identification table (e.g., proxy-1 GAPs identification table 410, and proxy-2 GAPs identification table 412) in response to a GAP registration request 430 from a GAP. The dispatcher 102 may include a GAPs request queue 432 to store web service requests and web service request components when a web service requests an unavailable GAP, which will be explained in further detail below.

Figure 5:
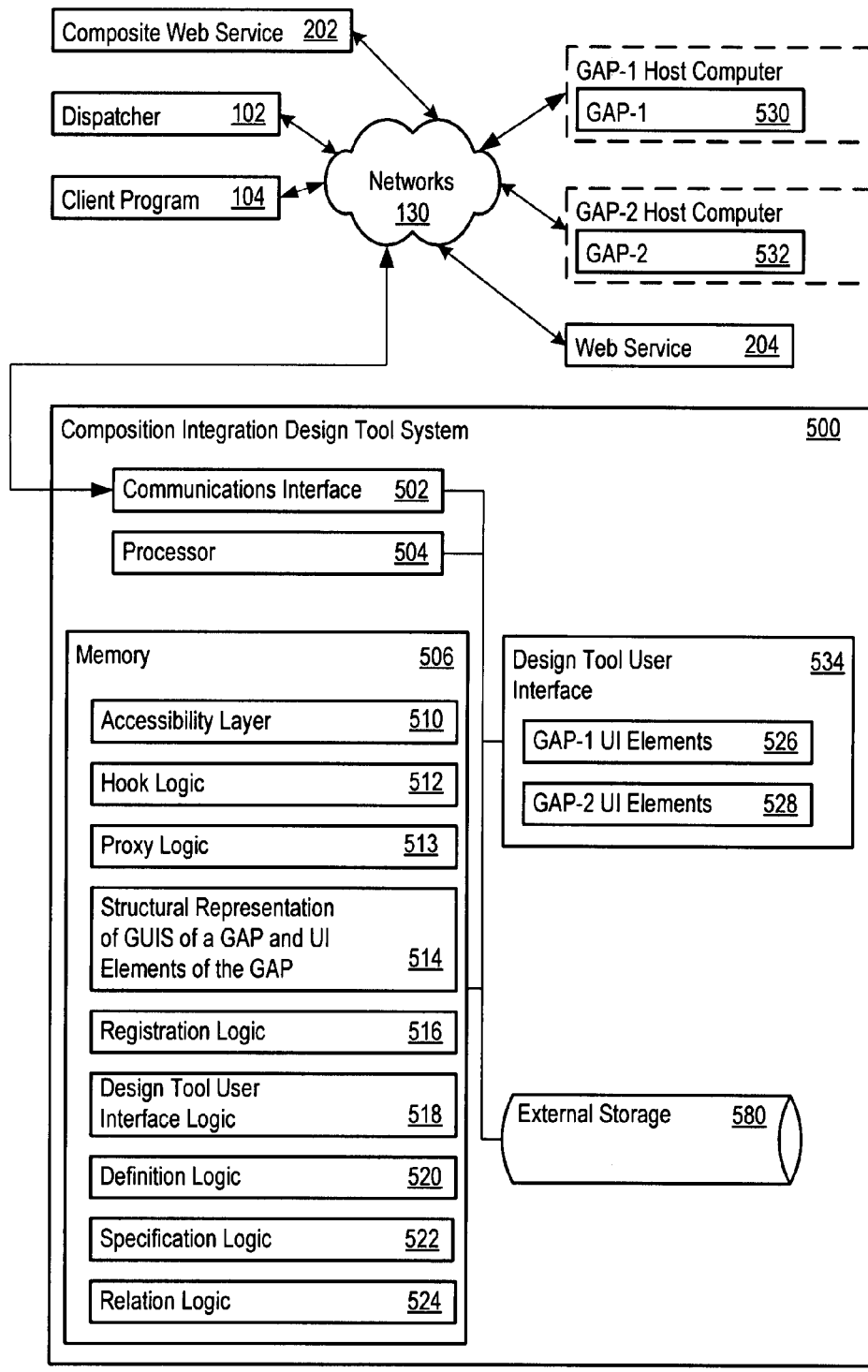
FIG. 5 shows a composition integration design tool system.

FIG. 5 shows a composition integration design tool system 500. The composition integration design tool system 500 may include a communications interface 502, a processor 504, and memory 506. The composition integration design tool system 500 memory 506 may include: interaction logic 508; accessibility layer 510; hook logic 512; proxy logic 513; a structural representation of GUIs of a GAP and UI elements of the GAP 514; registration logic 516; design tool user interface logic 518; definition logic 520; specification logic 522; and relation logic 524.

The interaction logic 508 captures one or more GAP-1 UI elements 526, and one or more GAP-2 UI elements 528 using the accessibility layer 510. In other words, the Interaction logic 508 may capture a structural representation of GUIs of a GAP and UI elements of the GAP 514 through the accessibility layer 510 using the hook logic 512 to communicate with the GAPs (e.g., GAP-1 530, GAP-2 532, and corresponding GAP-1 UI elements 526 and GAP-2 UI elements 528). Proxy logic 513 may control the GAPs through the hook logic 512, and the proxy logic 513 may use the registration logic 516 to send GAP registration requests 430 to the dispatcher 102. The structural representation of GUIs of a GAP and UI elements of the GAP 514 may include a GAP UI element label, a UI element Identifier, and location information in the GAP GUI for the GAP UI elements (e.g., GAP-1 UI elements 526 and GAP-2 UI elements 528), and may also include a GAP GUI screen sequence representation for each GAP GUI screen sequence.

Figure 6:
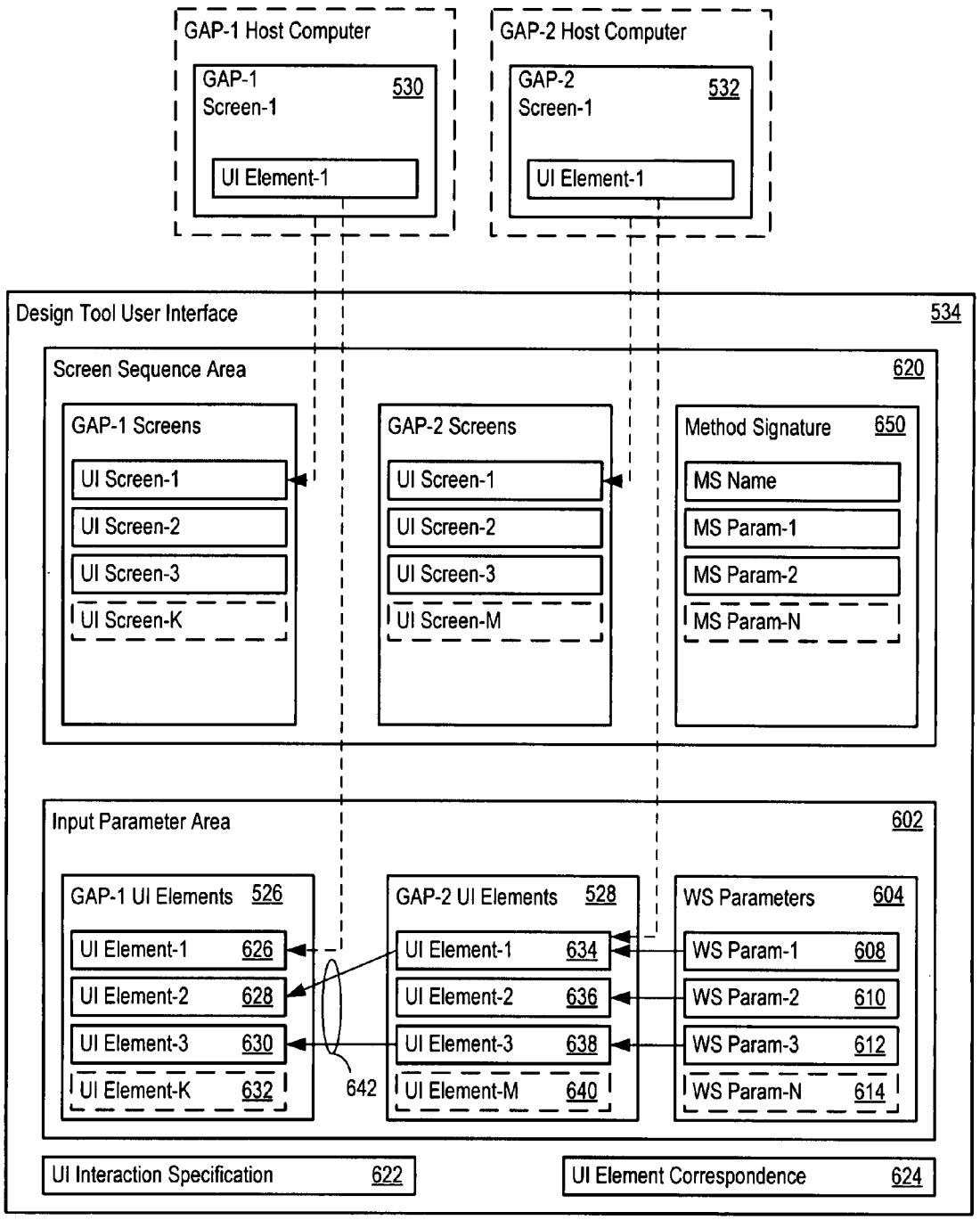
FIG. 6 shows one example implementation of a design tool user interface.

FIG. 6 shows one example implementation of a design tool user interface 518. The design tool user interface logic 518 may generate a design tool user interface 534 that includes an input parameter area 602 and a screen sequence area 620. The design tool user interface logic 518 provides additional, fewer, or different interface elements. The design tool user interface logic 518 may include a point-and-click interface, drag-and-drop interface or both a point-and-click interface, drag-and-drop interface between GAP UI elements (e.g., GAP-1 UI elements 526 and GAP-2 UI elements 528) and the input parameter area 602, and determine operator selections (i.e., UI interactions) of GAP UI elements, as well as web service parameters 604 (e.g., WS parameter-1 608, WS parameter-2 610, and WS parameter-3 612). The design tool user interface 534 may use the drag-and-drop interface to move GAP UI elements (e.g., GAP-1 UI elements 526 and GAP-2 UI elements 528) and web service parameters 604 into the input parameter area 602, and the GAP GUI screen sequences into the screen sequence area 620 to establish a user interface interaction specification 622 that creates a UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, FIG. 6 shows an arrow 642 drawn (e.g., by an operator or from input from an automated analysis tool) from GAP-2 UI element-1 634 to GAP-1 UI element-2 628, which establishes a UI element correspondence 624 between the two GAP UI elements. The design tool user interface 534 may include a method signature 650 that defines the name of a web service method, the parameters, and the method type. The method signature 650 may also specify error or exception handling procedures and the parameter types of each method parameter.

Figure 7:
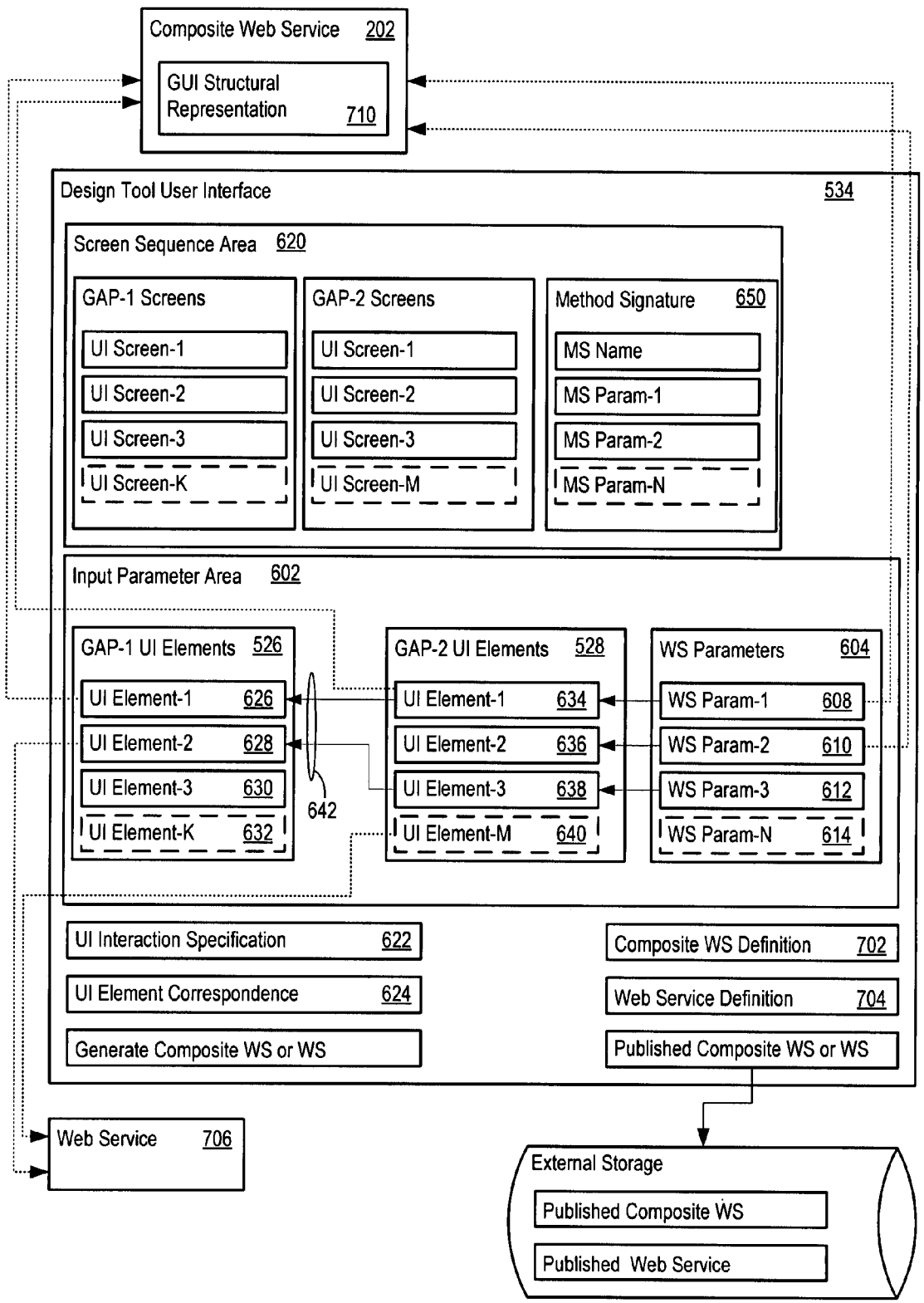
FIG. 7 shows a design tool user interface and composite web service.

FIG. 7 shows a design tool user interface and composite web service. The design tool user interface 534 may use the definition logic 520 to establish a composite web service definition 702. Thus, the definition logic 520 may establish the composite web service definition 702 for a composite web service 202, including one or more web service parameters 604 (e.g., WS parameter-1 608, WS parameter-2 610, and WS parameter-3 612), a web service name, or other web service parameters. The design tool user interface 534 may generate the composite web service 202, and publish the composite web service 202. The design tool user interface 534 may use the definition logic 520 to establish a web service definition 704 for a web service 706, based on the structural representation of GUIs of a GAP and UI elements of the GAP 514 using the accessibility layer 510. The design tool user interface 534 may use the specification logic 522 to establish the user interface interaction specifications 622. For example, the specification logic 522 may create the UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, the user interface interaction specification 622 may create a UI element correspondence 624 between the GAP-2 UI element-1 634 and the GAP-1 UI element-2 628 that defines an exchange of an invoice amount from the GAP-2 UI element-1 634 (e.g., an invoice field amount in the MIE GAP) to an expense amount in the GAP-1 UI element-2 628 (e.g., an expense field amount in the AEG). The specification logic 522 may establish the user interface interaction specification 622 from multiple GAP-1 UI elements 526 (e.g., GAP-1 UI element-1 626, GAP-1 UI element-2 628, and GAP-1 UI element-3 630), to multiple GAP-2 UI elements 528 (e.g., GAP-2 UI element-1 634, GAP-2 UI element-2 636, and GAP-2 UI element-3 638).

Figure 8:
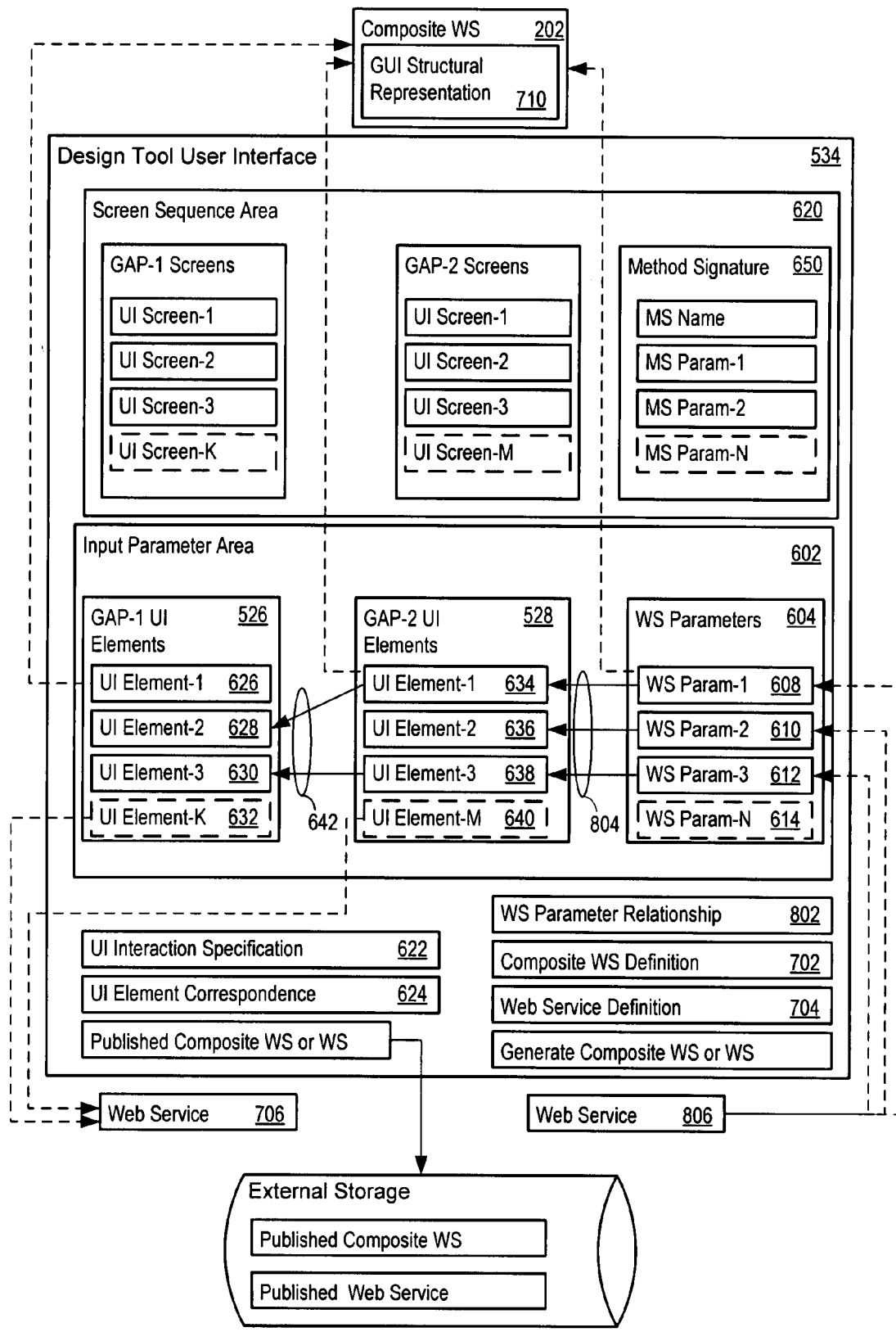
FIG. 8 shows a design tool user interface and web service parameter relationship.

FIG. 8 shows a design tool user interface and web service parameter relationship. The relation logic 524 may establish a web service parameter relationship 802 between at least one of the web service parameters 604 (e.g., WS parameter-1 608, WS parameter-2 610, and WS parameter-3 612), and at least one of the GAP-2 UI elements 528 (e.g., GAP-2 UI element-1 556, GAP-2 UI element-2 558, and GAP-2 UI element-3 560). For example, FIG. 8 shows arrows 804 drawn (e.g., by an operator or from input from an automated analysis tool) from WS parameter-3 612 to GAP-2 UI element-3 638, that establish a web service parameter relationship 802 between a web service parameter and GAP UI element. The web service parameter relationship 802 may specify each of the GAP UI element labels of the GAP UI elements used. In another implementation, the relation logic 514 may establish a web service parameter relationship 802 between at least one of the web service parameters 604 (e.g., WS parameter-1 608, WS parameter-2 610, and WS parameter-3 612), and at least one of the GAP-1 UI elements 526 (e.g., GAP-1 UI element-1 626, GAP-1 UI element-2 628, and GAP-1 UI element-3 630) or at least one of the GAP-2 UI elements 528 (e.g., GAP-2 UI element-1 634, GAP-2 UI element-2 636, and GAP-2 UI element-3 638). In one implementation, the composite web service definition 702 for a composite web service 202 may include multiple web service parameters defined by a combination of GAP-1 UI elements 526, GAP-2 UI elements 528, and web service parameters 604 (e.g., WS parameter-1 608, WS parameter-2 610, and WS parameter-3 612) of a web service 804. The composition integration design tool system 500 may generate a web service 706 based on the web service definition 704 and the web service parameter relationship 802, and publish the web service 706.

Figure 9:
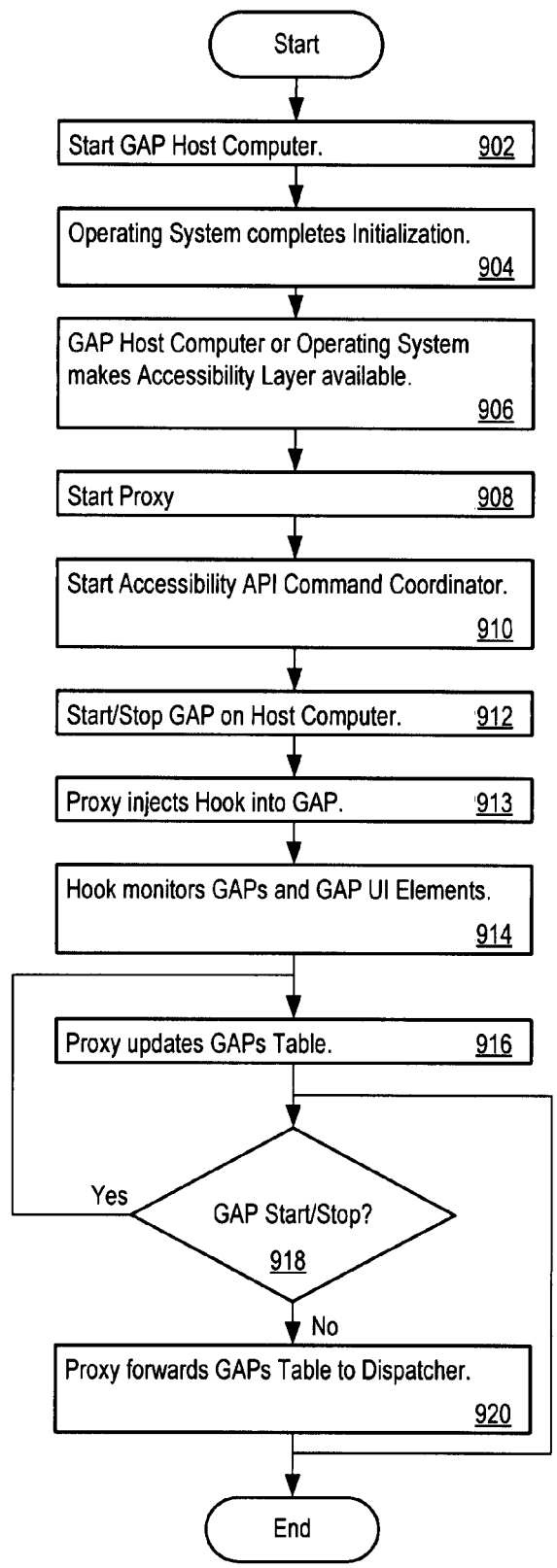
FIG. 9 shows the acts that a proxy may take to register GAPs with a dispatcher.

FIG. 9 shows the acts that a proxy, including the registration logic 326, may take to register GAPs with a dispatcher. Each GAP host computer runs a dedicated proxy that commands and controls the GAPs and UI elements hosted on the GAP host computer through dedicated hooks also hosted on the GAP host computer. The hooks perform actions on the GAPs and UI elements through the accessibility layer. Once the GAP host computer starts (Act 902) and the operating system completes initialization (Act 904), the operating system or GAP host computer makes the accessibility layer available (Act 906). The proxy starts (Act 908), and the proxy initiates the accessibility API command coordinator (Act 910). GAPs start or stop execution on the host computer (Act 912), during the operation of the host computer. The proxy injects (e.g., load) a hook into a GAP after the GAP starts (Act 913). Through the accessibility API command coordinator, the proxy directs the hook to monitor a GAP and GAP UI elements (Act 914). The hook forwards monitored GAP and UI element data and information to the proxy, which updates the GAPs Table (Act 916). If another GAP starts or stops execution (Act 918) the proxy updates the GAPs Table (Act 916). The proxy may periodically forward the GAPs Table to the dispatcher (Act 920).

Figure 10:
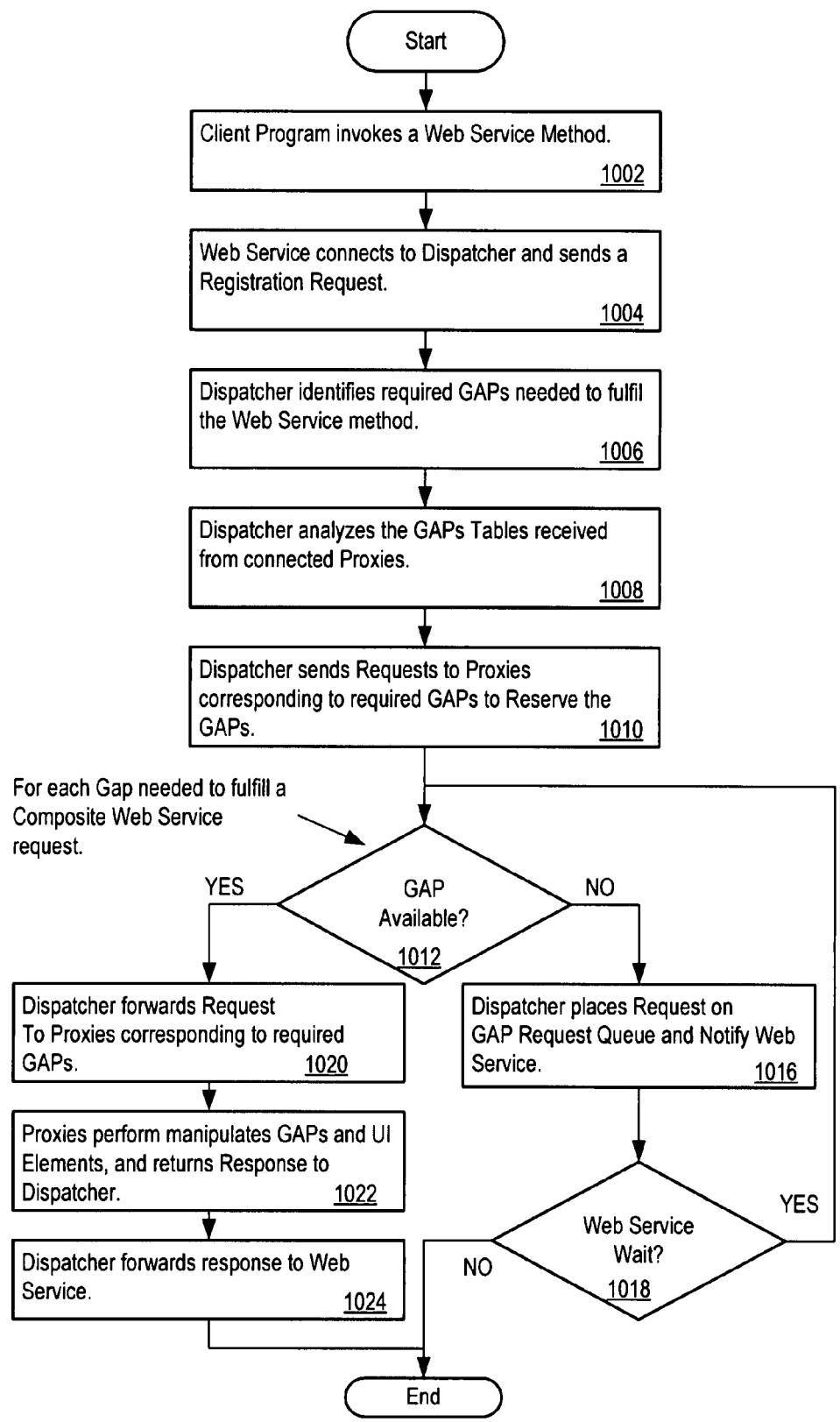
FIG. 10 shows the acts that a dispatcher may take to register a web service, and coordinate communication between web services and proxies.

FIG. 10 shows the acts that a dispatcher may take to register a web service, and coordinate communication between web services and proxies. When a client program invokes a method of a web service or a web service request component (Act 1002), the requesting web service or composite web service (e.g., web service 204 or composite web service 202) to which the method belongs connects to the dispatcher 102, and sends a web services registration request 428 (Act 1004). The dispatcher 102 may determine from the web services registration request 428 the identity of the GAPs required to fulfil the web service or composite web service method (Act 1006). The dispatcher may analyze the GAP Tables received from connected proxies (Act 1008), and sends web service requests or web service request components to the appropriate proxies to reserve the required GAPs (Act 1010). Web service requests and web service request components may include GAP identification data and information about the required GAP, the GAP UI elements, requested actions to perform on the GAP and UI elements, and the information to return to the requesting web service or composite web service. The dispatcher and proxy corresponding to a required GAP may communicate to determine the availability of a GAP (Act 1012). For unavailable GAPs, the dispatcher 102 may place the web service request or web service request component on the dispatchers GAP request queue and notifies the requesting web service or composite web service (e.g., web service 204 or composite web service 202) (Act 1016). The requesting web service or composite web service may determine whether to wait for an unavailable GAP to change status to available (Act 1018). For available GAPs, the dispatcher may forward the web service request or web service request component to the proxies corresponding to the required GAPs (Act 1020). The proxies corresponding to the required GAPs may command and control the GAPs and UI elements according to the web service request or web service request component, and return responses to the dispatcher 102 (Act 1022). The dispatcher may forward responses from proxies to the requesting web service or composite web service, or other web services or composite web services if required (Act 1024).

Figure 11:
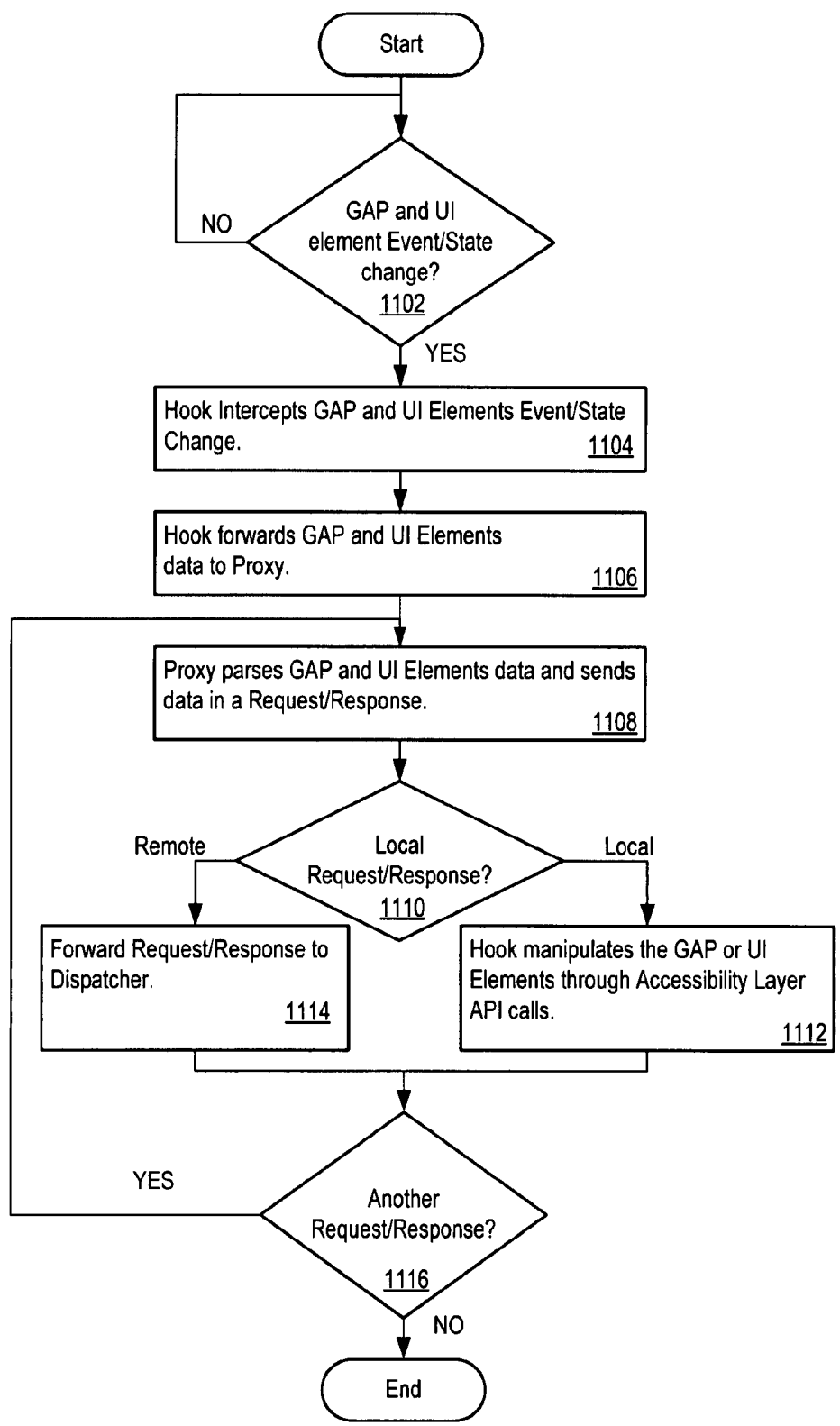
FIG. 11 shows the acts that a hook may take to command and control a UI element.

FIG. 11 shows the acts that a hook may take to command and control a UI element. The hook monitors a GAP and UI elements for event and state changes (Act 1102). When a GAP or UI element event or state changes the hook intercepts the event or state change (Act 1104). The hook forwards GAP and UI element event and state change information to the controlling proxy (Act 1106). The proxy parses GAP and UI element data, and prepares to send information in a request or response to the appropriate destination (Act 1108). The proxy identifies the destination of the request or response as Local or Remote (Act 1110). For Local requests or responses, the proxy forwards the request or response to the hook, and the hook manipulates the GAP or UI elements through accessibility layer API calls (Act 1112). For remote requests or responses, the proxy forwards the request or response to the dispatcher (Act 1114), and the proxy determines whether to parse additional GAP and UI elements data from the hook (Act 1116).

Figure 12:
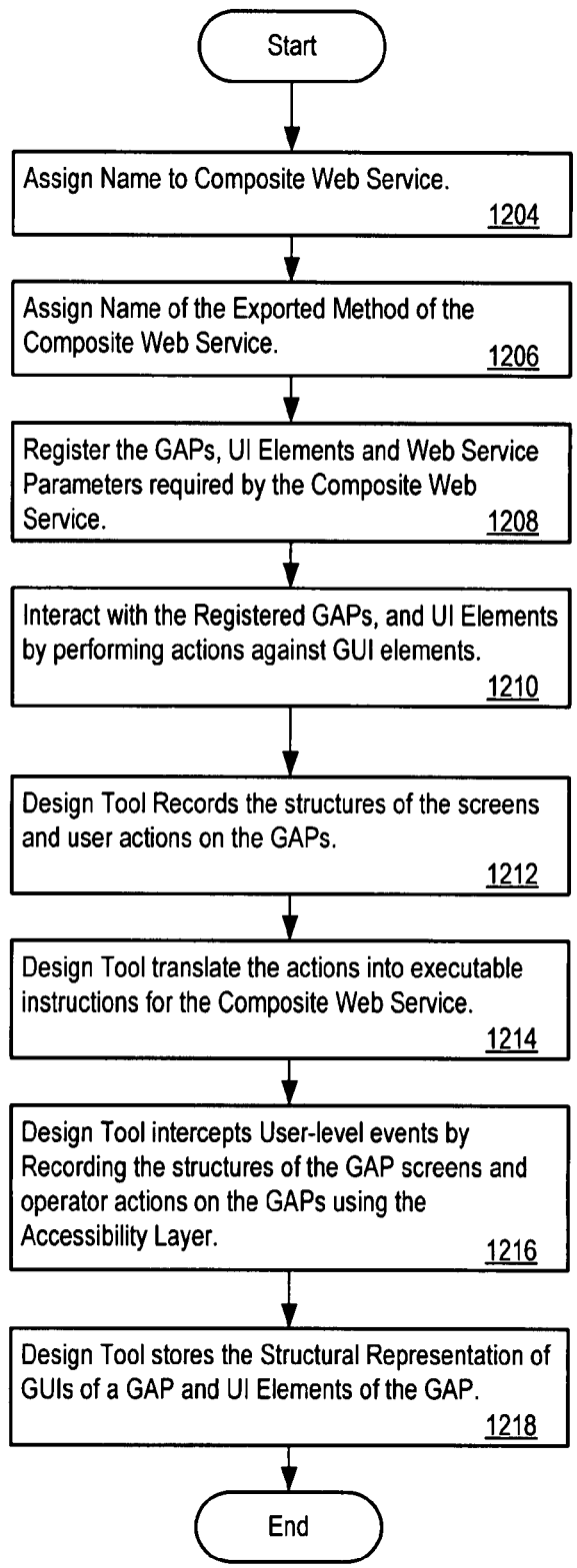
FIG. 12 shows the acts the composition integration design tool system may take to capture the structural representation of GUIs of a GAP and UI elements of the GAP.

FIG. 12 shows the acts the composition integration design tool system may take to capture the structural representation of GUIs of a GAP and UI elements of the GAP. The operator assigns a name to the composite web service (Act 1204), and the operator assigns a name to the exported or published method of the composite web service (Act 1206). The operator registers each GAP, UI element and web service parameters required by the composite web service (Act 1208). The operator interacts with the registered GAPs, UI elements and web service parameters through the design tool's GUI Interface (Act 1210). The design tool captures the structural representation of GUIs of a GAP and UI elements of the GAP through the accessibility layer as a result of the operator interactions with the registered GAPs and UI elements (Act 1212). The design tool may translate the GAP and UI elements actions resulting from the operator interactions into executable instructions for the composite web service (Act 1214). The design tool, through the accessibility layer, records the structures of the GAP screens and operator actions on the GAPs to intercept user-level events (e.g., operator interactions with the GAP and UI elements) (Act 1216). The design tool stores the structural representation of GUIs of a GAP and UI elements of the GAP for use operationally after generating and publishing the composite web service (Act 1218).

FIG. 13 shows a web service creation tool 1300. In FIG. 13, the web service creation tool 1300 may include: a dispatcher 1302; a client program 1304; a web service 1306; a GAP 1 host computer 1308; and external storage 1310. The web service creation tool 1300 components may communicate through the networks 1312 (e.g., the Internet). FIG. 13 also shows the dispatcher 1302 coordinating communication between a single web service 1306 and proxy-1 1314. The dispatcher 1302 acts as an intermediary that enables web services and GAPs to run on separate computers while presenting a common view to client programs 1304. In one implementation of the web service creation tool 1300, when a client program 1304 invokes a web service method corresponding to web service 1306, the web service 1306 sends a web service request to the dispatcher 1302. The dispatcher 1302 may route the web service request to proxy-1 1314 based on GAP identification data and GAP information collected from the proxy-1 1314. The GAP-1 host computer 1308 runs an operating system 1316, provides an accessibility layer 1318, and hosts the proxy-1 1314, the hook-1 1320 and GAP-1 with GUI elements 1322. The operating system 1316 may provide the accessibility layer 1318 with an accessibility API. The proxy-1 1314 registers with the dispatcher 1302 under a unique name, collects GAP identification data and information about the GAP-1 with GUI elements 1322 running with the proxy-1 1314 on the GAP-1 host computer 1308, and sends the GAP identification data and information to the dispatcher 102. In one implementation, when proxy-1 1322 receives a web service request, the proxy-1 1322 interacts with one or more UI elements of the GAP-1 with UI elements 1322 through the hook-1 1320, in response to the web service request. The accessibility layer 1318 may support hook-1 1320 to monitor and control execution of GAP-1 with UI elements 1322, and perform various actions on GAP-1 with UI elements 1322 programmatically.

FIG. 14 shows a structural representation of a GUI of a GAP and UI elements of the GAP. The structural representation of a GUI of a GAP and UI elements of the GAP 1402 may include: a GAP-1 UI element-1 label 1404; a GAP-1 UI element-1 Identifier 1406; location information in the GAP GUI for the GAP UI elements (e.g., GAP-1 UI element-1 location 1408, GAP-1 UI element-2 location 1410, and GAP-1 UI element-3 location 1412); and a GAP GUI screen sequence Representation 1416 for each GAP GUI Screen sequence. The structural representation of GUIs of a GAP and UI elements of the GAP 1402 may represent multiple GAP-1 GUI Screens (e.g., GAP-1 GUI screen sequence-1 1416, GAP-1 GUI screen sequence-2 1418, and GAP-1 GUI screen sequence-3 1420), and encode location information for the GAP-1 with UI elements 1322 (e.g., GAP-1 GUI element-1 encoded location information 1432).

Figure 15:
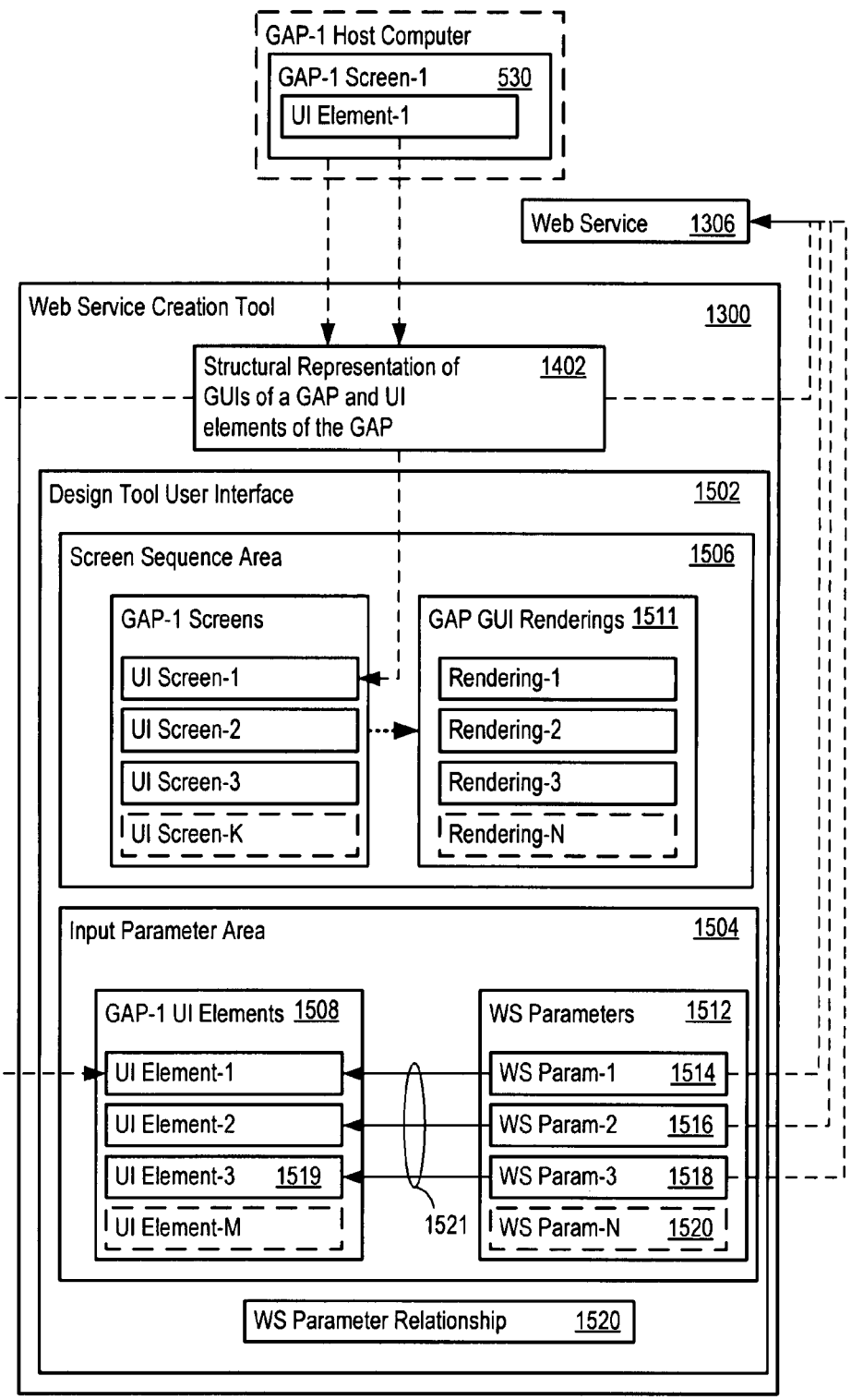
FIG. 15 shows a design tool user interface for a web service creation tool.

FIG. 15 shows a design tool user interface for a web service creation tool. The design tool user interface 1502 may include an input parameter area 1504 and a screen sequence area 1506. The design tool user interface 1502 may include a drag-and-drop interface used to move GAP-1 UI elements 1508 and GAP GUI Screens represented in the structural representation of GUIs of a GAP and UI elements of the GAP 1402 into the input parameter area 1504 and screen sequence area 1506. The design tool user interface 1502 may consider the act of moving GAP-1 UI elements 1508 and GAP GUI Screens represented in the structural representation of GUIs of a GAP and UI elements of the GAP 1402 into the input parameter area 1504 and screen sequence area 1506 as adding objects to or registering objects with the web service definition 1510. The design tool user interface 1502 may highlight a GAP-1 GUI element in the GAP-1 GUI, add the GAP-1 GUI element to the web service definition 1510 or move the GAP-1 GUI element the input parameter area 1504, in response to an operator's selection of a GAP-1 UI element or a GAP GUI Screen represented in the structural representation of GUIs of a GAP and UI elements of the GAP 1402. The web service creation tool 1300 may include a GAP GUI rendering 1511 of a GAP GUI screen sequence illustrating traversal through multiple GAP GUI Screens, and at least one of the web service parameters 1512 (e.g., WS parameter-1 1514, WS parameter-2 1516, and WS parameter-3 1518) for the web service 1306. The design tool user interface 1502 may create a web service parameter relationship 1520 between at least one of the web service parameters 1512 and at least one of the GAP-1 UI elements 1508, and generate the web service 1306 based on the web service definition 1510 and the web service parameter relationship 1520. For example, FIG. 15 shows an arrow 1521 drawn (e.g., by an operator or from input from an automated analysis tool) from WS parameter-3 1518 to GAP-2 UI element-3 1519, which establishes a web service parameter relationship 1520 between a web service parameter and GAP UI element. The design tool user interface 1502 may create additional web service parameter relationships 1512 between the web service 1306 and additional GAP-1 UI elements 1508 as a result of adding the additional GAP-1 UI elements 1508 to the input parameter area 1504. The design tool user interface 1502 may use the accessibility layer 1318 to support the hook-1 1320 to monitor execution of GAP-1 with UI elements 1322, and GAP-1 UI elements 1508 through multiple GAP GUI Screens, and capture the structural representation of GUIs of a GAP and UI elements of the GAP 1402.

Figure 16:
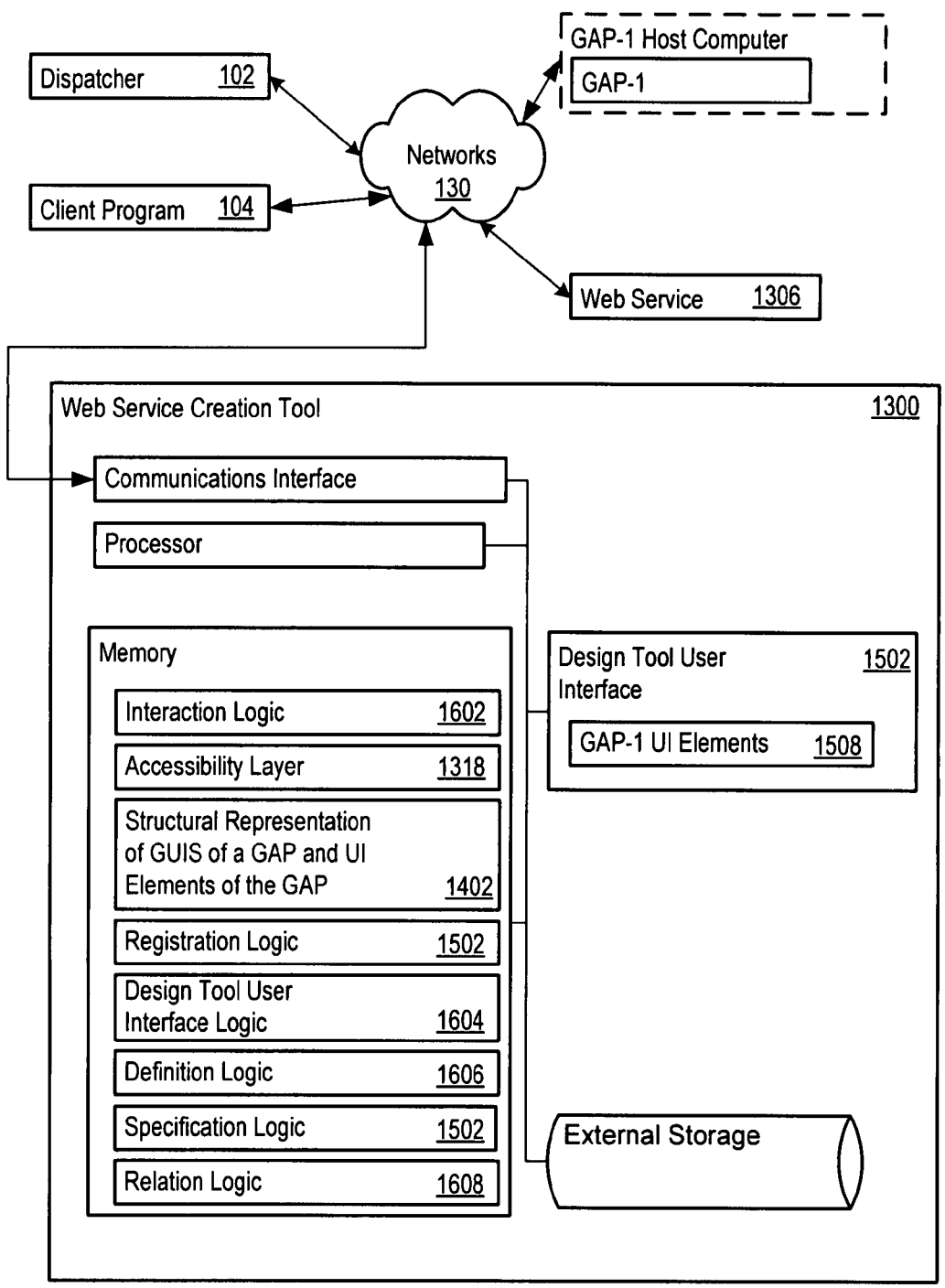
FIG. 16 shows one example implementation of the web service creation tool.

FIG. 16 shows one example implementation of the web service creation tool. The web service creation tool 1300 may include: Interaction logic 1602; design tool user interface logic 1604; definition logic 1606; and relation logic 1608. The Interaction logic 1602 may use the accessibility layer 1318 to capture the structural representation of GUIs of a GAP and UI elements of the GAP 1402. The Interaction logic 1602 may monitor operator interactions with GAP-1 through multiple GAP-1 GUI Screens and GAP UI elements 1508, and establish the structural representation of GUIs of a GAP and UI elements of the GAP 1402 across multiple GAP-1 GUI Screens. The Interaction logic 1602 may also obtain location information and identification information for multiple GAP-1 UI elements 1508, and record the location information and the identification information in the structural representation of GUIs of a GAP and UI elements of the GAP 1402.

The design tool user interface logic 1604 may generate the design tool user interface 1502 that includes the input parameter area 1504 and a screen sequence area 1506, monitor and determine an operator's selection of at least one of the GAP-1 UI elements 1508 in the GAP GUI represented in the structural representation of GUIs of a GAP and UI elements of the GAP 1402, and add the selected GAP-1 UI elements 1508 to the input parameter area 1504. The definition logic 1526 may establish the web service definition with at least one of the web service parameters 1512 (e.g., WS parameter-1 1514, WS parameter-2 1516, and WS parameter-3 1518) that will interact with the at least one of the GAP-1 UI elements 1508. The relation logic 1608 may establish a web service parameter relationship 1520 between at least one of the web service parameters 1512 (e.g., WS parameter-1 1514, WS parameter-2 1516, and WS parameter-3 1518) and at least one of the GAP-1 UI elements 1508. The relations logic 1608 may establish multiple web service parameter relationships 1520 with multiple web service parameters 1512 (e.g., WS parameter-1 1514, WS parameter-2 1516, and WS parameter-3 1518) and each of the GAP-1 UI elements 1508.

Figure 17:
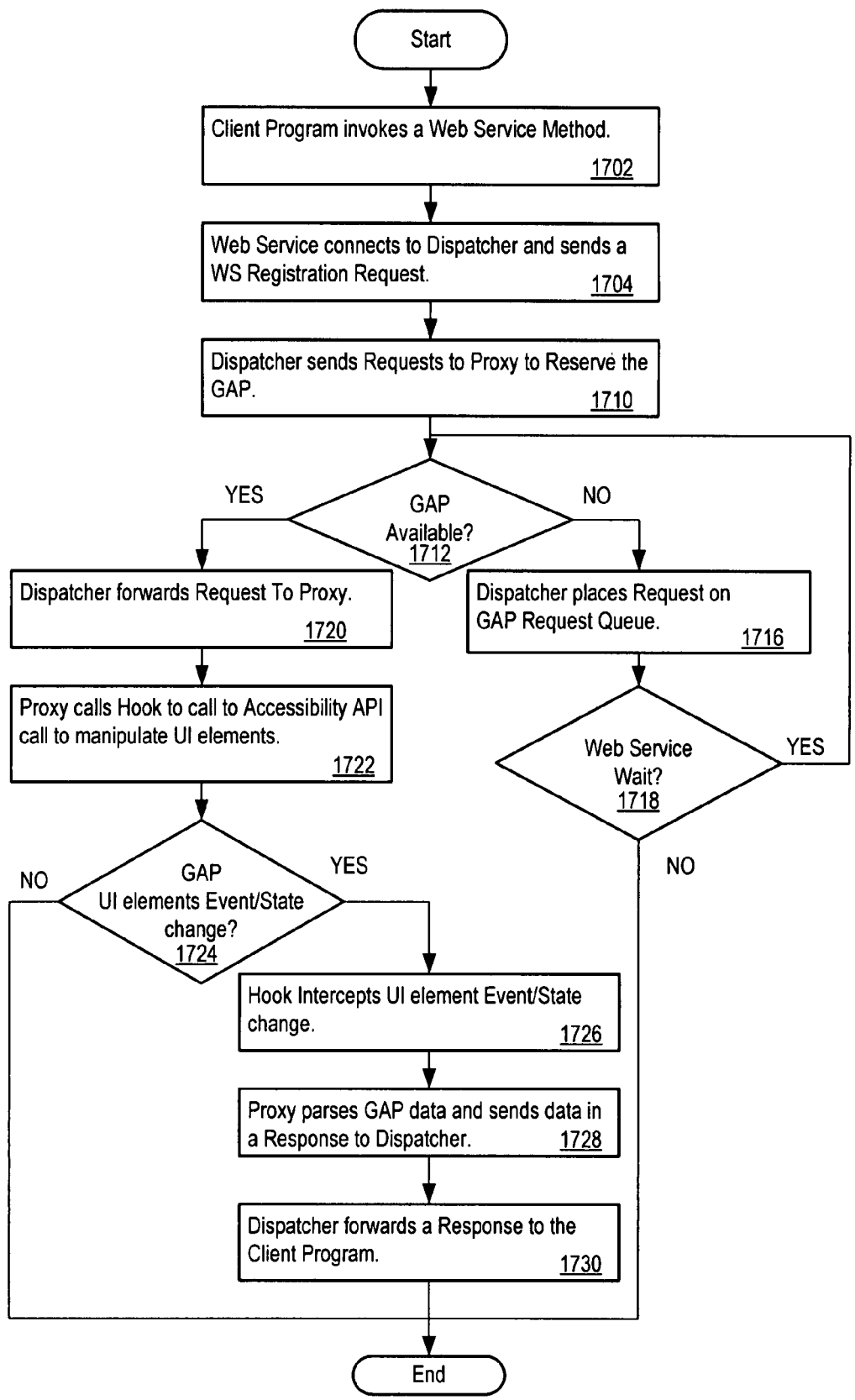
FIG. 17 shows the acts that a proxy and dispatcher may take in a web service creation tool.

FIG. 17 shows the acts that a proxy and dispatcher may take in a web service creation tool. When a client program invokes a method of a web service (Act 1702), the requesting web service (e.g., web service 204) to which the method belongs connects to the dispatcher 102, and sends a web services registration request 428 (Act 1704). The dispatcher 102 may determine from the web service registration request 428 and analyze the GAP Table received from connected proxy the identity of the GAP required to fulfil the web service method, and send web service requests to the proxy to reserve the GAP (Act 1710). Web service requests may include GAP identification data and information about the required GAP, the GAP UI elements, requested actions to perform on the GAP and UI elements, and the information to return to the requesting web service. The dispatcher 102 and proxy corresponding to the required GAP may communicate to determine the availability of the GAP (Act 1712). For an unavailable GAP, the dispatcher 102 may place the web service request on the dispatchers GAP request queue and notifies the requesting web service or composite web service (e.g., web service 204) (Act 1716). The requesting web service may determine whether to wait for the unavailable GAP to change status to available (Act 1718). For an available GAP, the dispatcher may forward the web service request to the proxy (Act 1720). The proxy for the required GAP may command and control the GAP and UI elements according to the web service request, and return responses to the dispatcher 102 (Act 1722). The hook monitors the GAP and UI elements for event and state changes (Act 1724). When a GAP or UI element event or state changes the hook intercepts the event or state change, and forwards GAP and UI element event and state change information to the controlling proxy (Act 1726). The proxy parses GAP and UI element data, and prepares and sends information in a response to the dispatcher (Act 1728). The dispatcher forwards the response to the client program (Act 1730).

A number of implementations have been described. Nevertheless, it will be understood that various modifications may be made without departing from the spirit and scope of the invention. Accordingly, other implementations are within the scope of the following claims.

What is claimed is:

1. A computer-implemented method for creating a web service that controls a graphical user interface application (GAP), comprising:
   interacting with a GAP through an accessibility layer, wherein the accessibility layer comprises an application programming interface (API) through which accessibility technologies implemented by the GAP interact, and capturing, through the accessibility layer:
   a GAP user interface element;
   a structural representation of a graphical user interface (GUI) of the GAP, including the GAP user interface element;
   establishing a web service definition comprising a web service parameter for a web service that will interact with the GAP user interface element using the accessibility layer based on the structural representation;
   creating a web service parameter relationship between the web service parameter and the GAP user interface element; and
   generating the web service based on the web service definition and the web service parameter relationship.

2. The method of claim 1, where capturing the structural representation comprises:
   capturing a GAP GUI screen sequence.

3. The method of claim 1, where capturing the structural representation comprises:
   capturing location information in the GAP GUI for the GAP user interface element.

4. The method of claim 1, where capturing the structural representation comprises:
   capturing a GUI element label for the GAP user interface element; and where:
   the web service parameter relationship specifies the element label.

5. The method of claim 1, further comprising:
   publishing the web service.

6. A processing system comprising at least one processor coupled to a memory for controlling a graphical user interface application (GAP) through a web service, the processing system further comprising:
   a communication interface operable to receive a web service request message comprising:
   a GAP user interface element identifier; and
   an action request identifier;
   an executing GAP comprising a GAP user interface element identified by the GAP user interface element identifier;
   a hook into the executing GAP supported by an accessibility layer, wherein the accessibility layer comprises an application programming interface (API) through which accessibility technologies implemented by the GAP interact;
   a structural representation of a graphical user interface (GUI) of the GAP, including the GAP user interface element; and
   a proxy operable to extract the GAP user interface element identifier and the action request identifier, and perform an action against the GAP user interface element specified in the action request identifier through the hook.

7. The processing system of claim 6, where the structural representation comprises:
   location information for the GAP user interface element in the GAP GUI.

8. The processing system of claim 6, further comprising:
   registration logic operable to register the executing GAP and the proxy with a dispatcher.

9. The processing system of claim 6, further comprising:
   a GAP identification table comprising GAP identifiers for multiple locally hosted GAPs, including the executing GAP.

10. The processing system of claim 9, further comprising:
    registration logic operable to communicate the GAP identification table to a dispatcher.

11. The processing system of claim 6, where the action comprises:
    a GUI element data setting action to be performed against the GAP user interface element specified in the action request identifier.

12. The processing system of claim 6, where the action comprises:
a GUI element data retrieval action to be performed against the GAP user interface element specified in the action request identifier.

13. A product comprising:
a non-transitory computer readable medium; and instructions stored on the computer readable medium comprising:
interaction logic operable to use an accessibility layer, wherein the accessibility layer comprises an application programming interface (API) through which accessibility technologies implemented by the GAP interact, to capture:
a user interface element of a graphical user interface application (GAP); and
a structural representation of the graphical user interface (GUI) of the GAP, including the GAP user interface element;
definition logic operable to establish a web service definition comprising a web service parameter for a web service that will interact with the GAP user interface element using the accessibility layer based on the structural representation;
relation logic operable to establish a web service parameter relationship between the web service parameter and the GAP user interface element; and
integration logic operable to generate a web service based on the web service definition and the web service parameter relationship.

14. The product of claim 13, where the structural representation comprises:
a GAP GUI screen sequence representation.

15. The product of claim 13, where the structural representation comprises:
location information in the GAP GUI for the GAP user interface element.

16. The product of claim 13, where the structural representation comprises:
a GUI element label for the GAP user interface element; and where:
the web service parameter relationship comprises the element label.

17. A product comprising: a non-transitory computer readable medium; and instructions stored on the computer readable medium comprising:
communication logic operable to receive a web service request message for controlling a graphical user interface application (GAP), the web service request message comprising:
a GAP user interface element identifier that identifies a GAP user interface element; and
an action request identifier; and
proxy logic operable to:
extract the GAP user interface element identifier and the action request identifier;
analyze a structural representation of a graphical user interface (GUI) of the GAP, including the GAP user interface element, to locate the GAP user interface element in the GAP GUI;
identify a hook into the executing GAP supported by an accessibility layer, wherein the accessibility layer comprises an application programming interface (API) through which accessibility technologies implemented by the GAP interact; and
initiate an action against the GAP user interface element specified in the action request identifier through the hook.

18. The product of claim 17, further comprising:
registration logic operable to register the GAP with a dispatcher.

19. The product of claim 18, where the registration logic is operable to:
communicate a GAP identification table comprising GAP identifiers for multiple locally hosted GAPs to the dispatcher.

20. The product of claim 17, where the structural representation comprises:
a GAP GUI screen sequence.

21. The product of claim 17, where the action comprises:
a GUI element data setting action to be performed against the GAP user interface element specified in the action request identifier.

* * * * *

UNITED STATES PATENT AND TRADEMARK OFFICE
CERTIFICATE OF CORRECTION

| | |
|---|---|
| PATENT NO. | : 7,971,183 B2 |
| APPLICATION NO. | : 11/710680 |
| DATED | : June 28, 2011 |
| INVENTOR(S) | : Grechanik et al. |

It is certified that error appears in the above-identified patent and that said Letters Patent is hereby corrected as shown below:

Title page, column 1, Item (54) (Title), line 1, delete "TOOL" and insert -- DESIGN TOOL --, therefor.

Title page, column 2, lines 12-13, under "OTHER PUBLICATIONS", delete "(wohlstad/Jacksoni/devanbu" and insert -- (wohlstad --, therefor.

Title page, column 2, line 15, under "OTHER PUBLICATIONS", delete "Sofware" and insert -- Software --, therefor.

First page of Specification, column 1, line 1, delete "TOOL" and insert -- DESIGN TOOL --, therefor.

Signed and Sealed this
Twenty-seventh Day of September, 2011

David J. Kappos
*Director of the United States Patent and Trademark Office*